(12) United States Patent
Qin et al.

(10) Patent No.: US 11,834,201 B2
(45) Date of Patent: *Dec. 5, 2023

(54) METHODS, APPARATUSES AND SYSTEMS FOR PREDICTING RADIO ALTIMETER FAILURE

(71) Applicant: Honeywell International Inc., Charlotte, NC (US)

(72) Inventors: Yuan Qin, Atlanta, GA (US); Jan Zirnstein, Atlanta, GA (US); Matthew Damon Emery, Winchester (GB); Nikhita Sagar, Atlanta, GA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,706

(22) Filed: Jul. 25, 2022

(65) Prior Publication Data
US 2022/0363413 A1 Nov. 17, 2022

Related U.S. Application Data

(63) Continuation of application No. 16/577,374, filed on Sep. 20, 2019, now Pat. No. 11,414,215.

(51) Int. Cl.
| | | |
|---|---|---|
| G06F 17/00 | (2019.01) | |
| B64F 5/60 | (2017.01) | |
| G01C 5/00 | (2006.01) | |
| G05B 13/02 | (2006.01) | |
| G08G 5/00 | (2006.01) | |
| G01S 13/88 | (2006.01) | |
| G01S 13/935 | (2020.01) | |

(52) U.S. Cl.
CPC ............. *B64F 5/60* (2017.01); *G01C 5/005* (2013.01); *G01S 13/882* (2013.01); *G01S 13/935* (2020.01); *G05B 13/026* (2013.01); *G08G 5/0021* (2013.01)

(58) Field of Classification Search
CPC ......... B64F 5/60; G01C 5/005; G01S 13/882; G01S 13/935; G01S 7/40; G05B 13/026; G08G 5/0021; G08G 5/0052
USPC .......................................................... 701/14
See application file for complete search history.

(56) References Cited

U.S. PATENT DOCUMENTS

| | | | | |
|---|---|---|---|---|
| 5,826,833 | A | * 10/1998 | Evans | ..................... B64C 13/16 |
| | | | | 701/15 |
| 6,584,839 | B1 | 7/2003 | Hedrick | |
| 6,626,024 | B1 | 9/2003 | Hedrick | |

(Continued)

OTHER PUBLICATIONS

Aircraft Altimeter Failure (Year: 2011).*

(Continued)

*Primary Examiner* — Ronnie M Mancho
(74) *Attorney, Agent, or Firm* — Alston & Bird LLP

(57) ABSTRACT

Methods, apparatuses, and systems for predicting radio altimeter failures are provided. An example method may include determining a first plurality of altitude values associated with a first radio altimeter, determining a second plurality of altitude values associated with a second radio altimeter, calculating a first level feature based at least in part on the first plurality of altitude values and the second plurality of altitude values, and determining a radio altimeter failure indicator based at least in part on the first level feature.

20 Claims, 11 Drawing Sheets

(56) References Cited

U.S. PATENT DOCUMENTS

| | | | |
|---|---|---|---|
| 6,633,810 B1* | 10/2003 | Qureshi | B64D 43/00 340/975 |
| 6,734,808 B1* | 5/2004 | Michaelson | G01C 21/22 340/984 |
| 6,750,815 B2 | 6/2004 | Michaelson et al. | |
| 8,209,122 B2 | 6/2012 | Nichols et al. | |
| 8,483,889 B2* | 7/2013 | Ishihara | G01C 23/005 340/961 |
| 8,493,241 B2 | 7/2013 | He | |
| 8,643,533 B1* | 2/2014 | Woodell | G01S 13/953 342/26 B |
| 8,965,730 B2* | 2/2015 | Yuen | A61B 5/02416 702/141 |
| 9,075,144 B1* | 7/2015 | Straub | G01S 7/4052 |
| 9,568,492 B2* | 2/2017 | Yuen | A61B 5/1123 |
| 9,599,632 B2* | 3/2017 | Yuen | G01P 15/14 |
| 10,459,085 B1* | 10/2019 | Bell | G01S 19/40 |
| 11,048,273 B2* | 6/2021 | Worsham, II | B64C 27/006 |
| 2002/0109628 A1* | 8/2002 | Diesel | G01S 19/26 342/357.31 |
| 2003/0206119 A1* | 11/2003 | Riley | G05D 1/0055 340/963 |
| 2008/0243316 A1 | 10/2008 | Sacle et al. | |
| 2010/0201565 A1 | 8/2010 | Khatwa | |
| 2011/0029162 A1 | 2/2011 | Ishihara et al. | |
| 2012/0016539 A1* | 1/2012 | Krishnamurthy | G01C 5/005 701/8 |
| 2013/0274994 A1* | 10/2013 | Albouy | G06F 11/0784 701/33.4 |
| 2015/0122018 A1* | 5/2015 | Yuen | A61B 5/4812 73/514.01 |
| 2015/0212782 A1 | 7/2015 | Samuthirapandian et al. | |
| 2016/0356892 A1* | 12/2016 | Block | G01C 5/005 |
| 2017/0350973 A1* | 12/2017 | Dunik | G01S 19/47 |

OTHER PUBLICATIONS

An integrated_GPS_INS_baro_and_radar_altimeter_system_for_aircraft_precision_approach_landings (Year: 2023).*
Notice of Allowance and Fees Due (PTOL-85) dated Apr. 7, 2022 for U.S. Appl. No. 16/577,374.

* cited by examiner

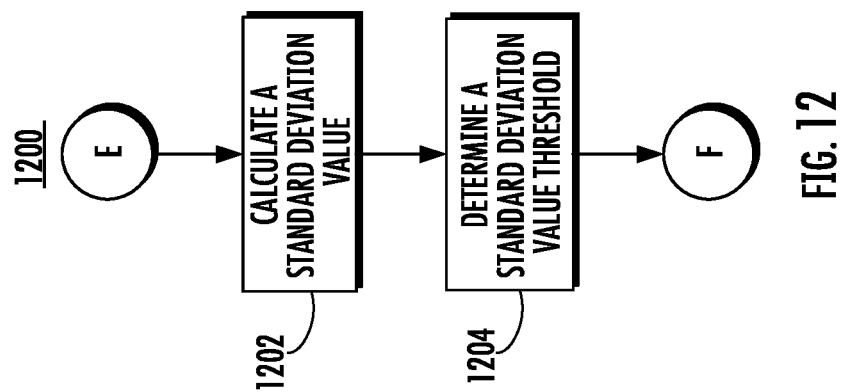

METHODS, APPARATUSES AND SYSTEMS FOR PREDICTING RADIO ALTIMETER FAILURE

CROSS REFERENCE TO RELATED APPLICATIONS

This application is a continuation of U.S. application Ser. No. 16/577,374, titled "METHODS, APPARATUSES AND SYSTEMS FOR PREDICTING RADIO ALTIMETER FAILURE," filed Sep. 20, 2019, the contents of which are incorporated herein by reference in their entirety.

FIELD OF THE INVENTION

The present disclosure relates generally to methods, apparatuses, and systems associated with radio altimeter, and more particularly, to methods, apparatuses, and systems for predicting radio altimeter failure.

BACKGROUND

A "radio altimeter" or a "low range radio altimeter" is an electronic device that may measure the distance from one point to another point. For example, when a radio altimeter is equipped on an aircraft (such as, but is not limited to, airplanes, helicopters, airships, gliders, hot air balloons), the radio altimeter may measure the height of the aircraft above the terrain that is below the aircraft (i.e. the altitude above the terrain). In some examples, radio altimeters may play an important role when the aircraft is approaching, at a low level, or during nighttime by, for example, supplying the altitude information for determining the landing decision height (DH).

However, many systems and methods do not overcome technical challenges and difficulties associated with radio altimeter. For example, many systems do not have the capability to detect radio altimeter failures that may, for example, return erroneous altitude readings. As another example, many systems cannot predict whether a radio altimeter failure is likely to occur. In these systems, when a radio altimeter failure takes place, the aircraft performance may be impacted, which may cause flight delays, cancellations, and/or high maintenance cost.

BRIEF SUMMARY

In accordance with various examples, an apparatus may be provided. The apparatus may comprise at least one processor and at least one non-transitory memory comprising program code. The at least one non-transitory memory and the program code may be configured to, with the at least one processor, cause the apparatus to at least: determine a first plurality of altitude values associated with a first radio altimeter; determine a second plurality of altitude values associated with a second radio altimeter; calculate a first level feature based at least in part on the first plurality of altitude values and the second plurality of altitude values; and determine a radio altimeter failure indicator based at least in part on the first level feature. In some examples, the first level feature may comprise a plurality of mode value differences.

In some examples, when calculating the first level feature, the at least one non-transitory memory and the program code may be configured to, with the at least one processor, cause the apparatus to further: calculate a first plurality of mode values of the first plurality of altitude values; calculate a second plurality of mode values of the second plurality of altitude values; and calculate the plurality of mode value differences between the first plurality of mode values and the second plurality of mode values.

In some examples, the first radio altimeter and the second radio altimeter may be associated with an aircraft. In some examples, the first plurality of altitude values and the second plurality of altitude values may be associated with the aircraft in a cruising mode.

In some examples, when determining the radio altimeter failure indicator, the at least one non-transitory memory and the program code may be configured to, with the at least one processor, cause the apparatus to further calculate a second level feature based at least in part on the first level feature.

In some examples, when calculating the second level feature, the at least one non-transitory memory and the program code may be configured to, with the at least one processor, cause the apparatus to further: determine a plurality of time values associated with the plurality of mode value differences; and select a subset of mode value differences from the plurality of mode value differences. In some examples, corresponding time values associated with the subset of mode value differences may satisfy a time value threshold.

In some examples, the at least one non-transitory memory and the program code may be configured to, with the at least one processor, cause the apparatus to further: calculate a maximum difference value based on the subset of mode value differences; and determine whether the maximum difference value satisfies a maximum difference value threshold.

In some examples, the at least one non-transitory memory and the program code may be configured to, with the at least one processor, cause the apparatus to further: in response to determining that the maximum difference value does not satisfy the maximum difference value threshold, cause the radio altimeter failure indicator to indicate a radio altimeter failure.

In some examples, the at least one non-transitory memory and the program code may be configured to, with the at least one processor, cause the apparatus to further: in response to determining that the maximum difference value satisfies the maximum difference value threshold, cause the radio altimeter failure indicator to indicate no radio altimeter failure.

In some examples, when calculating the second level feature, the at least one non-transitory memory and the program code may be configured to, with the at least one processor, cause the apparatus to further: calculate a mean value based on the subset of altitude value differences; and determine whether the mean value satisfies a mean value threshold.

In some examples, when calculating the second level feature, the at least one non-transitory memory and the program code may be configured to, with the at least one processor, cause the apparatus to further: calculate a standard deviation value based on the subset of altitude value differences; and determine whether the standard deviation value satisfies a standard deviation value threshold.

In accordance with various examples, an apparatus may be provided. The apparatus may comprise at least one processor and at least one non-transitory memory comprising program code. The at least one non-transitory memory and the program code may be configured to, with the at least one processor, cause the apparatus to at least: determine a first plurality of altitude values associated with a first radio altimeter; determine a second plurality of altitude values associated with a second radio altimeter; calculate a first level feature based at least in part on the first plurality of altitude values and the second plurality of altitude values; and determine a radio altimeter failure indicator based at least in part on the first level feature. In some examples, the first level feature may comprise a plurality of altitude value differences.

In some examples, the plurality of altitude value differences may comprise a plurality of median value differences. In some examples, when calculating the first level feature, the at least one non-transitory memory and the program code may be configured to, with the at least one processor, cause the apparatus to further: calculate a first plurality of median values of the first plurality of altitude values; calculate a second plurality of median values of the second plurality of altitude values; and calculate the plurality of median value differences between the first plurality of median values and the second plurality of median values.

In some examples, the plurality of altitude value differences may comprise a plurality of mean value differences. In some examples, when calculating the first level feature, the at least one non-transitory memory and the program code may be configured to, with the at least one processor, cause the apparatus to further: calculate a first plurality of mean values of the first plurality of altitude values; calculate a second plurality of mean values of the second plurality of altitude values; and calculate the plurality of mean value differences between the first plurality of mean values and the second plurality of mean values.

In some examples, the plurality of altitude value differences may comprise a plurality of standard deviation value differences. In some examples, when calculating the first level feature, the at least one non-transitory memory and the program code may be configured to, with the at least one processor, cause the apparatus to further: calculate a first plurality of standard deviation values of the first plurality of altitude values; calculate a second plurality of standard deviation values of the second plurality of altitude values; and calculate the plurality of standard deviation value differences between the first plurality of standard deviation values and the second plurality of standard deviation values.

In accordance with various examples, a computer-implemented method may be provided. The computer-implemented method may comprise: determining a first plurality of altitude values associated with a first radio altimeter; determining a second plurality of altitude values associated with a second radio altimeter; calculating a first level feature based at least in part on the first plurality of altitude values and the second plurality of altitude values; and determining a radio altimeter failure indicator based at least in part on the first level feature. In some examples, the first level feature may comprise a plurality of altitude value differences.

In accordance with various examples, a computer program product may be provided. The computer program product may comprise at least one non-transitory computer-readable storage medium having computer-readable program code portions stored therein. The computer-readable program code portions may comprise an executable portion that is configured to: determine a first plurality of altitude values associated with a first radio altimeter; determine a second plurality of altitude values associated with a second radio altimeter; calculate a first level feature based at least in part on the first plurality of altitude values and the second plurality of altitude values; and determine a radio altimeter failure indicator based at least in part on the first level feature. In some examples, the first level feature comprises a plurality of altitude value differences.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 12 illustrates an example flow diagram in accordance with various embodiments of the present disclosure.

DETAILED DESCRIPTION OF THE INVENTION

Figure 1:
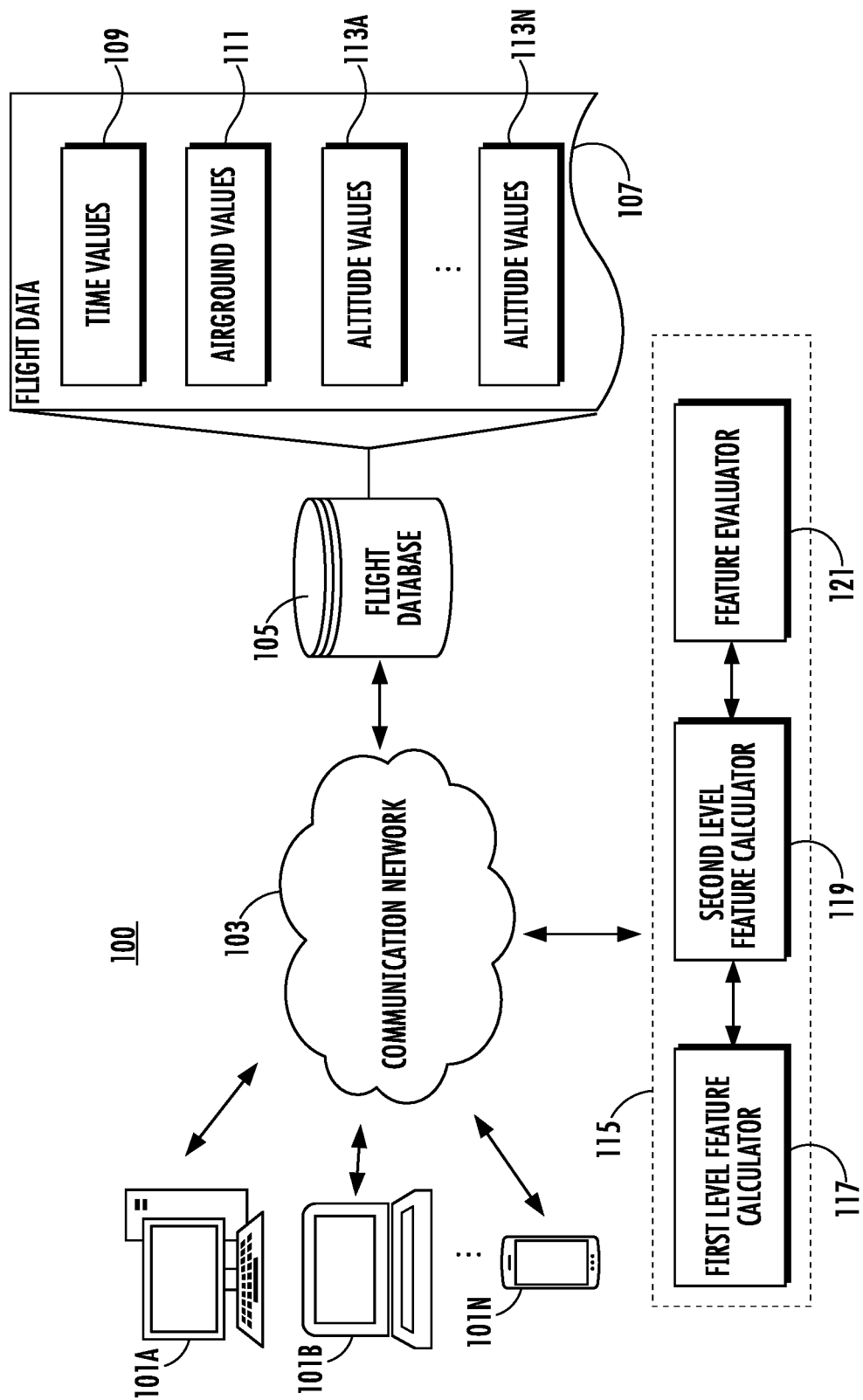
FIG. 1 illustrates an example schematic diagram of an example system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," "for example," "in some examples," "as an example," and the like generally mean that the particular feature, structure, or characteristic following the phrase may be included in at least one embodiment of the present disclosure, and may be included in more than one embodiment of the present disclosure (such phrases do not necessarily refer to the same embodiment).

The word "example" or "exemplary" is used herein to mean "serving as an example, instance, or illustration." Any implementation described herein as "example" or "exemplary" is not necessarily to be construed as preferred or advantageous over other implementations.

If the specification states a component or feature "may," "can," "could," "should," "would," "preferably," "possibly," "typically," "optionally," "for example," "in some examples," "often," or "might" (or other such language) be included or have a characteristic, that a specific component or feature is not required to be included or to have the characteristic. Such component or feature may be optionally included in some embodiments, or it may be excluded.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "electronically coupled," "electronically coupling," "electronically couple," "in communication with," "in electronic communication with," or "connected" in the present disclosure refers to two or more components (for example but not limited to, client device(s), a data analytics system, database(s)) being connected through wired means (for example but not limited to, wired Ethernet) and/or wireless means (for example but not limited to, Wi-Fi, Bluetooth, ZigBee), such that data and/or information may be transmitted to and/or received from these components.

The term "data analytics system" refers to a system or virtual environment that may be configured to generate data that may indicate the likelihood of a radio altimeter failure. The data analytics system may take the form of one or more central servers disposed in communication with one or more additional servers running software applications, and having access to one or more databases storing digital content items, application-related data, and/or the like. An example data analytics system is described at least in connection with FIG. 1 herein.

The term "user" should be understood to refer to an individual, group of individuals, business, organization, and the like. The users referred to herein may access a data analytics system using client devices. The term "client device" refers to computer hardware and/or software that is configured to access the data analytics system. Client devices may include, without limitation, smart phones, tablet computers, laptop computers, wearables, personal computers, enterprise computers, and the like.

In some examples, data and information (such as electronic requests) may be transmitted to and/or received from a data analytics system. For example, "radio altimeter failure prediction requests" may indicate a request to generate a radio altimeter failure indicator, which may indicate a likelihood of radio altimeter failure. In some examples, radio altimeter failure prediction requests may be transmitted to a data analytics system from a client device.

As described above, many systems and methods do not overcome technical challenges and difficulties associated with radio altimeters. For example, many systems lack the capability to detect or predict radio altimeter failures.

In contrast, various examples in accordance with the present disclosure may overcome these challenges and difficulties. In some examples, a data analytics system may be provided to analyze historical data associated with radio altimeters. The data analytics system may calculate a radio altimeter failure indicator based on historical data associated with the radio altimeter. As such, various examples of the present disclosure may improve operations by enabling maintenance teams to better manage and allocate resources and/or by improving aircraft reliability. Various examples may also reduce operation cost by limiting the cancellations and delays, minimizing spare part and supply requirements, and reducing time for failure check and device maintenance.

Methods, apparatuses, and computer program products of the present disclosure may be embodied by any of a variety of devices. For example, the method, apparatus, and computer program product of an example embodiment may be embodied by a networked device (e.g., a data analytics system), such as a server or other network entity, configured to communicate with one or more devices, such as one or more client devices. Additionally, or alternatively, the computing device may include fixed computing devices, such as a personal computer or a computer workstation. Additionally, or alternatively, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. Users may access a data analytics system 115 via a communication network 103 using client devices 101A, 101B, . . . 101N.

The client devices 101A-101N may be any computing device as defined above. Electronic data received by the data analytics system 115 from the client devices 101A-101N may be provided in various forms and via various methods. For example, the client devices 101A-101N may include desktop computers, laptop computers, smartphones, netbooks, tablet computers, wearables, and the like. In some examples, one or more of the client devices 101A-101N may each be assigned to a client device identifier that uniquely identifies the client device. In some examples, the client device identifier may comprise an American Standard Code for Information Interchange (ASCII) text, a pointer, a memory address, and the like.

In embodiments where a client device of client devices 101A-101N is a mobile device, such as a smart phone or tablet, the client device may execute an "app" to interact with the data analytics system 115. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via Application Programming Interfaces (APIs) provided by the mobile device operating system. In some examples, the app may provide a user interface that allows a user to interact with the data analytics system 115.

Additionally, or alternatively, the client devices 101A-101N may interact with the data analytics system 115 via a web browser. Additionally, or alternatively, the client devices 101A-101N may include various hardware or firmware designed to interface with the data analytics system 115.

The communication network 103 may include one or more wired or wireless communication networks including, for example, a wired or wireless local area network (LAN), personal area network (PAN), metropolitan area network (MAN), wide area network (WAN), or the like, as well as any hardware, software and/or firmware required to implement the one or more networks (such as, for example, network routers). For example, the communication network 103 may include general packet radio service (GPRS) network, Code Division Multiple Access 2000 (CDMA2000) network, Wideband Code Division Multiple Access (WCDMA) network, Global System for Mobile Communications (GSM) network, Enhanced Data rates for GSM Evolution (EDGE) network, Time Division-Synchronous Code Division Multiple Access (TD-SCDMA) network, Long Term Evolution (LTE) network, High Speed Packet Access (HSPA) network, High-Speed Downlink Packet Access (HSDPA) network, IEEE 802.11 (Wi-Fi), Wi-Fi Direct, and/or IEEE 802.16 (WiMAX). Additionally, or alternatively, the communication network 103 may include a public network (such as the Internet), a private network (such as an intranet), or combinations thereof.

In some examples, the communication network 103 may utilize networking protocols including, but not limited to, Hypertext Transfer Protocol (HTTP) protocol, one or more Transmission Control Protocol/Internet Protocol (TCP/IP) based networking protocols, Near Field Communication (NFC) protocols, Bluetooth protocols, and/or ZigBee protocols. For instance, the networking protocol may be customized to suit the needs of the data analytics system 115. In some embodiments, the protocol may be a custom protocol of JSON objects sent via a Websocket channel. In some embodiments, the protocol may be JSON over RPC, JSON over REST/HTTP, and the like.

Referring back to FIG. 1, the data analytics system 115 may be embodied as a computing device described above. For example, the data analytics system 115 may comprise at least one processor and at least one non-transitory memory storing computer program instructions. These computer program instructions may direct the data analytics system 115 to function in a particular manner, such that the instructions stored in the at least one non-transitory memory may produce an article of manufacture, the execution of which may implement embodiments of the present disclosure. As such, in some examples of the present disclosure, the data analytics system 115 may comprise a first level feature calculator 117, a second level feature calculator 119, and/or a feature evaluator 121.

The first level feature calculator 117, the second level feature calculator 119, and/or the feature evaluator 121 may be embodied in hardware means (such as circuitry or circuitries), software means (such as computer program codes), or a combination of hardware means and software means. In some examples, the first level feature calculator 117 may be configured to calculate one or more first level features. In some examples, the second level feature calculator 119 may be configured to calculate one or more second level features. In some examples, the feature evaluator 121 may be configured to determine a radio altimeter failure indicator. An example diagram illustrating various components of the data analytics system 115 is illustrated and described in connection with at least FIG. 2.

It is noted that various components in the data analytics system 115 may leverage the same computer or computing apparatus to perform operations in accordance with examples of the present disclosure. For example, the first level feature calculator 117, the second level feature calculator 119, and/or the feature evaluator 121 may leverage the same processor or memory to perform these functions. In some examples, the first level feature calculator 117, the second level feature calculator 119, and/or the feature evaluator 121 may utilize separated circuitries.

In various embodiments of the present disclosure, one or more electronic requests may be sent to the data analytics system 115, including, but not limited to, radio altimeter failure prediction requests. In some examples, these electronic requests may be in the form of HTTP requests. In some examples, these electronic requests may be sent to the data analytics system 115 over the communication network 103 directly by a client device of client devices 101A-101N. Additionally, or alternatively, the electronic requests may be sent to the data analytics system 115 via an intermediary.

In some examples, upon receiving the radio altimeter failure prediction requests, the data analytics system 115 may generate one or more data retrieval requests, and transmit the data retrieval requests to one or more databases, such as, but not limited to, a flight database 105 as shown in FIG. 1. Based on the data received from the one or more databases, the data analytics system 115 may generate a radio altimeter failure indicator, and may transmit the radio altimeter failure indicator to one or more of client devices 101A-101N.

Referring back to FIG. 1, the flight database 105 may be embodied as one or more data storage devices such as a Network Attached Storage (NAS) device or devices, or as a separate server or servers. The flight database 105 may include data and/or information accessible to the data analytics system 115 and/or the client devices 101A-101N.

In some examples, the flight database 105 may store data such as, but is not limited to, flight data 107, which may be associated with one or more flights of an aircraft. In some examples, the flight database 105 may store data recorded in a quick access recorder (QAR) of the aircraft.

For example, the flight data 107 may include, but not limited to, time values 109, airground values 111, and/or altitude values 113A-113N. In some examples, the airground values 111 may comprise an ASCII text, a pointer, a memory address, and the like, which may indicate whether the aircraft is in a cruising mode at a given point of time. In some examples, the altitude values 113A-113N may comprise an ASCII text, a pointer, a memory address, and the like, which may indicate one or more altitude values associated with one or more radio altimeters. In some examples, the time values 109 may comprise an ASCII text, a pointer, a memory address, and the like, which may indicate a timestamp (for example, date and time) of when an airground value of the airground values 111 or an altitude value of the altitude values 113A-113N was recorded. An example plot diagram illustrating various example airground values, altitude values, and time values is illustrated and described in connection with at least FIG. 3A, FIG. 3B, and FIG. 3C.

It is noted that the flight database 105 may leverage the same computer or computing apparatus to perform the above-described operations. For example, the flight database 105 may be integrated within the data analytics system 115, such the flight database 105 may be part of the data analytics system 115. In some examples, the flight database 105 and the data analytics system 115 may utilize separated circuitries.

Figure 2:
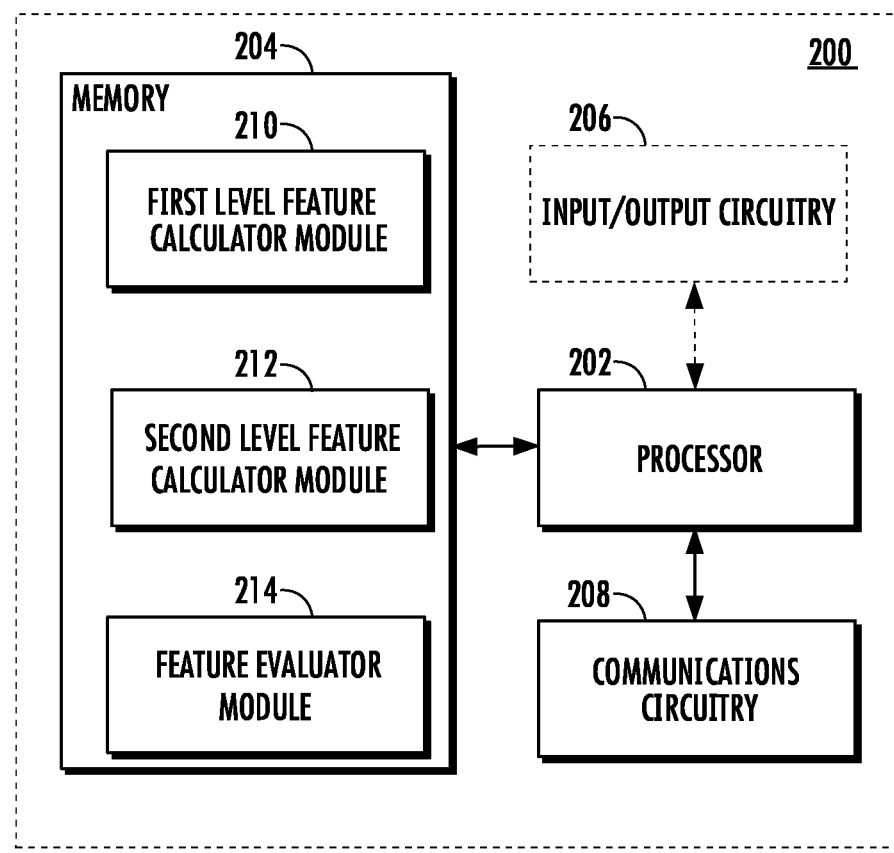
FIG. 2 illustrates an example block diagram of an example apparatus in accordance with various embodiments of the present disclosure.

The data analytics system 115 of FIG. 1 may be embodied by one or more computing systems, such as apparatus 200 as shown in FIG. 2. The apparatus 200 may include a processor 202, a memory 204, an input/output circuitry 206, and/or a communications circuitry 208. The apparatus 200 may be configured to execute the operations described above with respect to FIG. 1 and below with respect to FIGS. 3-12.

Although these components are described with respect to functional limitations, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

In the example as shown in FIG. 2, the memory 204 may store computer program instructions that may comprise a first level feature calculator module 210, a second level feature calculator module 212, and/or a feature evaluator module 214. When the first level feature calculator module 210 is executed by the processor 202, the apparatus 200 may be configured to calculate one or more first level features. When the second level feature calculator module 212 is executed by the processor 202, the apparatus 200 may be configured to calculate one or more second level features. When the feature evaluator module 214 is executed by the processor 202, the apparatus 200 may be configured to determine a radio altimeter failure indicator.

Additionally, or alternatively, the apparatus 200 may include one or more designated hardware configured for the first level feature calculator module 210, the second level feature calculator module 212, and/or the feature evaluator module 214. For example, the apparatus 200 may include a separate processor, specially configured Field Programmable Gate Array (FPGA), or Application Specific Integrated Circuit (ASIC) that are configured to perform the functions of the first level feature calculator module 210, the second level feature calculator module 212, and/or the feature evaluator module 214.

Referring back to FIG. 2, the processor 202 may be embodied in a number of different ways and may, for example, include one or more processing devices configured to perform independently. In some examples, the processor 202 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

As described above, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The communications circuitry 208 may be any means such as a device or circuitry embodied in either hardware or a combination of hardware and software that is configured to receive and/or transmit data from/to a network and/or any other device, circuitry, or module in communication with the apparatus 200 (such as the client devices 101A-101N and/or the flight database 105 described above in connection with FIG. 1). In this regard, the communications circuitry 208 may include, for example, a network interface for enabling communications with a wired or wireless communication network (such as the communication network 103 described above in connection with FIG. 1). For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

In some examples, the apparatus 200 may optionally include input/output circuitry 206 that may, in turn, be in communication with processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware.

Figure 3A:
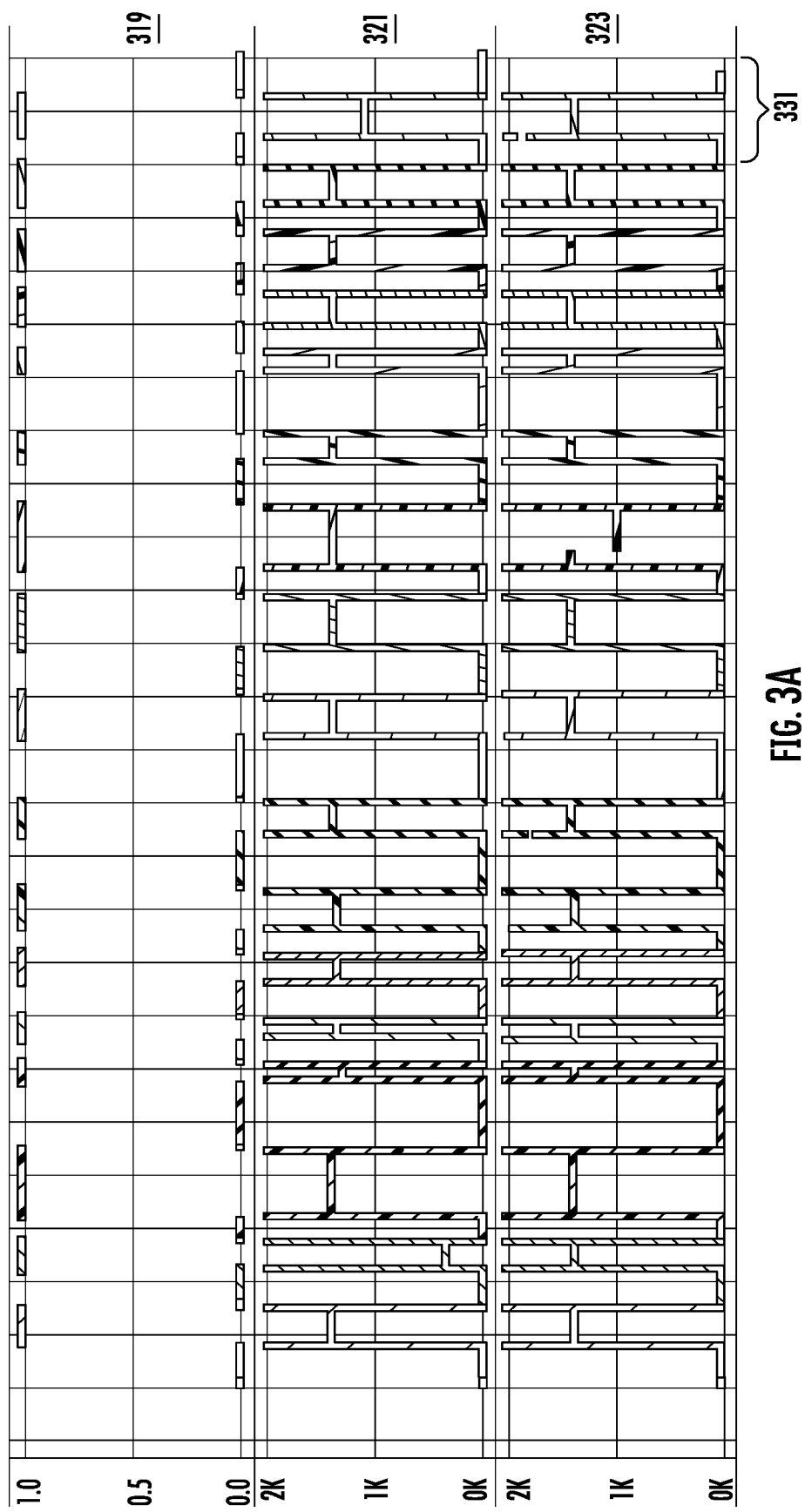
FIG. 3A illustrates an example plot diagram in accordance with various embodiments of the present disclosure.
Figure 3B:
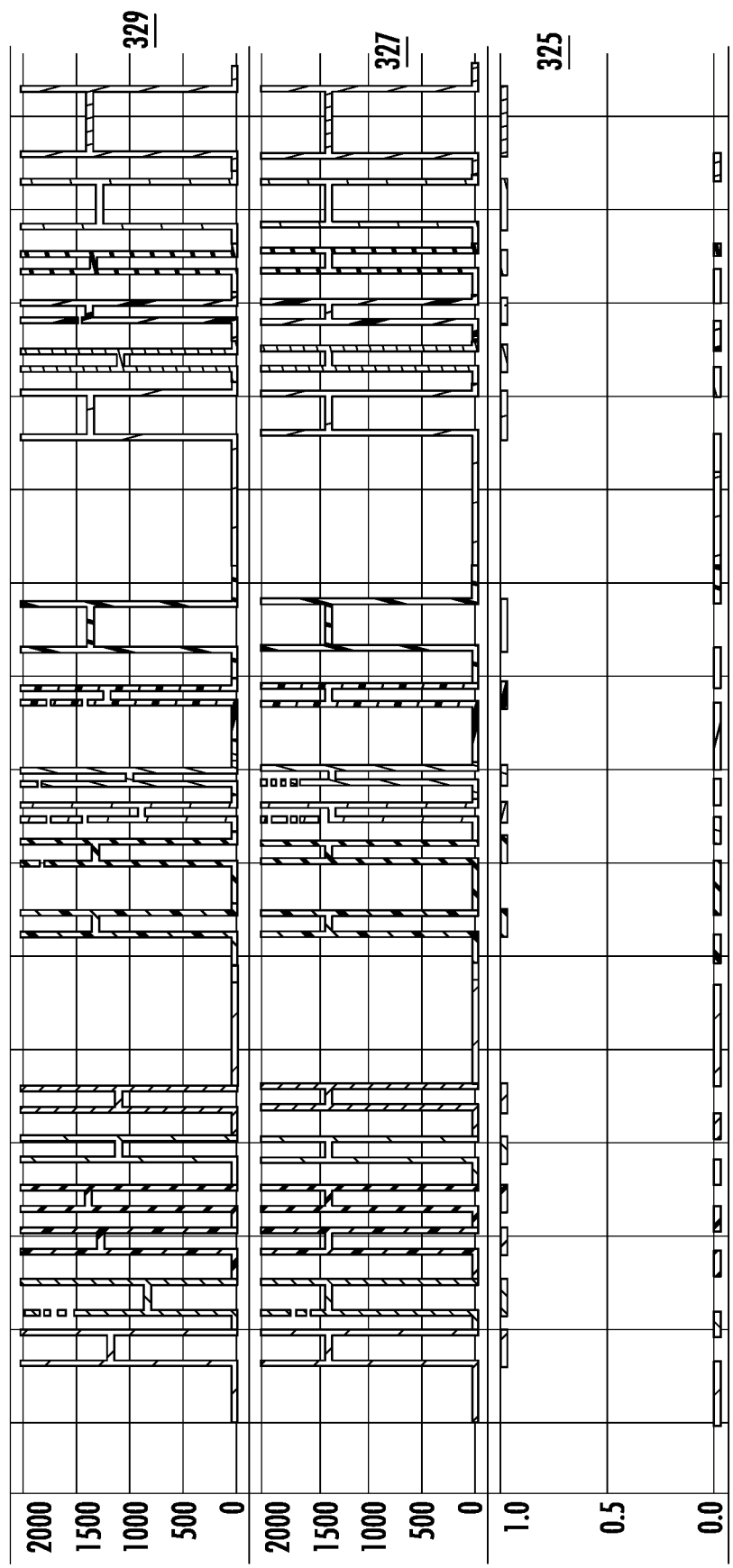
FIG. 3B illustrates an example plot diagram in accordance with various embodiments of the present disclosure.
Figure 3C:
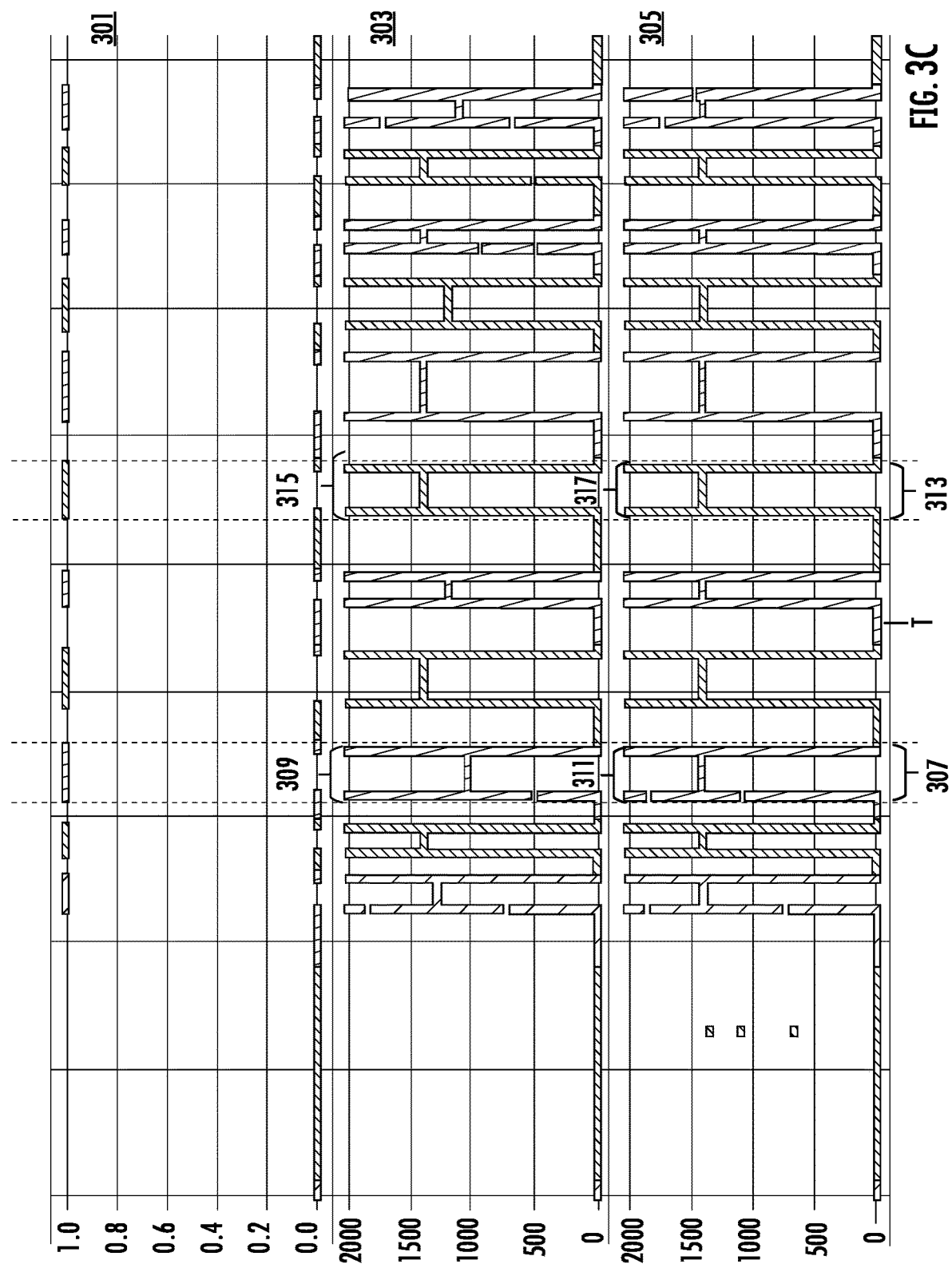
FIG. 3C illustrates an example plot diagram in accordance with various embodiments of the present disclosure.

Referring now to FIG. 3A, FIG. 3B, and FIG. 3C, example plot diagrams are illustrated. In particular, example plot diagrams may show example value sets (such as time values, airground values, and altitude values) associated with example flight data in an example flight database (such as, but not limited to, the flight database 105 described above in connection with FIG. 1). For example, each of the three plot diagrams may indicate example relationships between example airground values and example time values, as well as example relationships between example altitude values and example time values.

In FIG. 3A, the example plot diagram may comprise three portions: a portion 319, a portion 321, and a portion 323. The portion 319 may illustrate example relationships between example airground values (as shown in the y-axis) and example time values (as shown in the x-axis) associated with an example aircraft. The portion 321 may illustrate example relationships between example altitude values (as shown in the y-axis) and example time values (as shown in the x-axis) associated with a first radio altimeter. The portion 323 may illustrate example relationships between example altitude values (as shown in the y-axis) and example time values (as shown in the x-axis) associated with a second radio altimeter.

In FIG. 3B, the example plot diagram may comprise three portions: a portion 325, a portion 327, and a portion 329. The portion 325 may illustrate example relationships between example airground values (as shown in the y-axis) and example time values (as shown in the x-axis) associated with an example aircraft. The portion 327 may illustrate example relationships between example altitude values (as shown in the y-axis) and example time values (as shown in the x-axis) associated with a first radio altimeter. The portion 329 may illustrate example relationships between example altitude values (as shown in the y-axis) and example time values (as shown in the x-axis) associated with a second radio altimeter.

Referring now to FIG. 3C, the example plot diagram may comprise three portions: a portion 301, a portion 303, and a portion 305. The portion 301 may illustrate example relationships between example airground values (as shown in the y-axis) and example time values (as shown in the x-axis) associated with an example aircraft. The portion 303 may illustrate example relationships between example altitude values (as shown in the y-axis) and example time values (as shown in the x-axis) associated with a first radio altimeter. The portion 305 may illustrate example relationships between example altitude values (as shown in the y-axis) and example time values (as shown in the x-axis) associated with a second radio altimeter.

In some examples, the time values, the airground values, and/or the altitude values may be obtained from a quick access recorder (QAR) associated with an aircraft. In some examples, the time values, the airground values, and/or the altitude values may be obtained via other means.

As shown in the portion 301, the airground values may range from zero (0) to one (1). When the airground value equals to one (1) (as shown in the y-axis), it may indicate that the aircraft has left the ground at a given time point (as shown in the x-axis). When the airground value equals to zero (0) (as shown in the y-axis), it may indicate that the aircraft is on the ground at a given time point (as shown in the x-axis).

In some examples, when airground value equals to one (1), it may represent as an approximate indicator for determining that the aircraft is in a cruising mode. The term "cruising mode" refers to a flight phase where the aircraft may level after climbing to a set altitude and before beginning to descend. As an example, an airplane may carry out the following modes in a chronological order during an example flight: takeoff mode (during which the airplane may leave the ground), climbing mode (during which the airplane may increase the altitude to a predetermined level), cruising mode (during which the airplane may maintain or fluctuate around a predetermined altitude level), descending mode (during which the airplane may decrease its altitude), and landing mode (during which the airplane may return to the ground). In this example, the airplane is in the cruising mode subsequent to the climb mode and prior to the descend mode.

In some examples, the climbing mode and/or the descending mode may take a short amount of time while the aircraft has left the ground. In other words, the cruising mode may take the most amount of time while the aircraft has left the ground (i.e. when the airground value equals to one (1)). As such, example systems and method may use the airground value as an approximate indicator for determining that the aircraft is in a cruising mode.

In some examples, the airplane may be in the cruising mode once during every flight. In this example, the airground values as shown in the portion 301 may be associated with multiple flights. In some examples, an aircraft may be in the cruising mode more than once during a flight. For example, an aircraft may change altitude during a flight in order to, for example, avoid hash weather condition, avoid other air traffic, improve fuel consumption and/or a technical incident. In this example, an airplane may enter a second climbing mode after in a descending mode, and may enter a second cruising mode after the second climbing mode.

Referring back to FIG. 3C, the portion 303 and the portion 305 may each be associated with altitude values from a separate radio altimeter associated with an aircraft. For example, the altitude values as shown in portion 303 may be recorded by a left low range radio altimeter, while the altitude values as shown in portion 305 may be recorded by a right low range radio altimeter. The portion 303 and the portion 305 may show example altitude values (in the y-axis) from the radio altimeters and their corresponding time points (in the x-axis).

While the examples as shown in FIG. 3A, FIG. 3B, and FIG. 3C may illustrate altitude values from two radio altimeters, it is noted that the scope of the present disclosure is not limited to two radio altimeters. In some examples, altitude values from less than two or more than two radio altimeters may be utilized in accordance with various examples of the present disclosure.

In some examples, an example data analytics system may determine time values where the aircraft is in the cruising mode (for example, based on the relationships between airground values and the time values as shown in the portion 301). In some examples, an example data analytics system may select altitude values that are associated with the time values indicating that the aircraft is in a cruising mode (for example, based on the relationships between altitude values and the time values as shown in the portion 303 and in the portion 305).

For example, the data analytics system may determine that time value range 307 as shown in FIG. 3C is when the example aircraft is in the cruising mode during a flight, as the corresponding airground values equal to one (1) in the portion 301. The data analytics system may select altitude values 309 and 311 from portions 303 and 305, respectively, as time values correspond to these altitude values fall within the time value range 307.

As another example, the data analytics system may determine that time value range 313 as shown in FIG. 3C is when the example aircraft is in the cruising mode during another flight, as the corresponding airground values equal to one (1) in the portion 301. The data analytics system may select altitude values 315 and 317 from portions 303 and 305, respectively, as time values correspond to these altitude values fall within the time value range 313.

In some examples, the data analytics system may determine a radio altimeter failure indicator based at least in part on the altitude values. For example, FIG. 3A, FIG. 3B, and FIG. 3C may be associated with the same aircraft during different flights/dates: FIG. 3A may be associated with the data recorded from May $19^{th}$ to May $21^{st}$, FIG. 3B may be associated with data recorded from May $22^{nd}$ to May $24^{th}$, and FIG. 3C may be associated with data recorded from May $25^{th}$ and onward. In this example, portion 321 of FIG. 3A, portion 327 of FIG. 3B, and portion 303 of FIG. 3C may be associated with the same first radio altimeter during different flights. Portion 323 of FIG. 3A, portion 329 of FIG. 3B, and portion 305 of FIG. 3C may be associated with the same second radio altimeter during different flights.

In some examples, when there is no radio altimeter failure, the altitude values may remain stable when the aircraft is in a cruising mode. When a radio altimeter failure occurs, the altitude values may fluctuate or have been fluctuating. For example, the time value range 307 of FIG. 3C may correspond to a time period when the radio altimeter may have experienced failure, as indicated by the fluctuations between the altitude values 309 and 311. In some examples, the fluctuations may start before the radio altimeter failure occurs. For example, as shown in FIG. 3A, the fluctuations may start as early as time period 331, which may be an indicator of the future radio altimeter failure as shown in FIG. 3C.

Referring now to FIG. 4 to FIG. 12, example methods in accordance with various embodiments of the present disclosure are illustrated. In some examples, each block or step of the flowchart, and combinations of blocks and steps in the flowchart, may be implemented by various means such as hardware, circuitry and/or other devices associated with execution of software including one or more computer program instructions.

In some examples, one or more of the procedures described in the figures may be embodied by computer program instructions, which may be stored by a memory circuitry (such as a non-transitory memory) of an apparatus employing an embodiment of the present disclosure and executed by a processing circuitry (such as a processor) of the apparatus. These computer program instructions may direct the apparatus to function in a particular manner, such that the instructions stored in the memory circuitry produce an article of manufacture, the execution of which implements the function specified in the flowchart block(s). Further, the apparatus may comprise one or more other components, such as, for example, a communication circuitry and/or an input/output circuitry. Various components of the apparatus may be in electronic communication between and/or among each other to transmit data to and/or receive data from each other.

In some examples, embodiments may take the form of a computer program product on a non-transitory computer-readable storage medium storing computer-readable program instructions (e.g. computer software). Any suitable computer-readable storage medium may be utilized including non-transitory hard disks, CD-ROMs, flash memory, optical storage devices, and/or magnetic storage devices.

Figure 4:
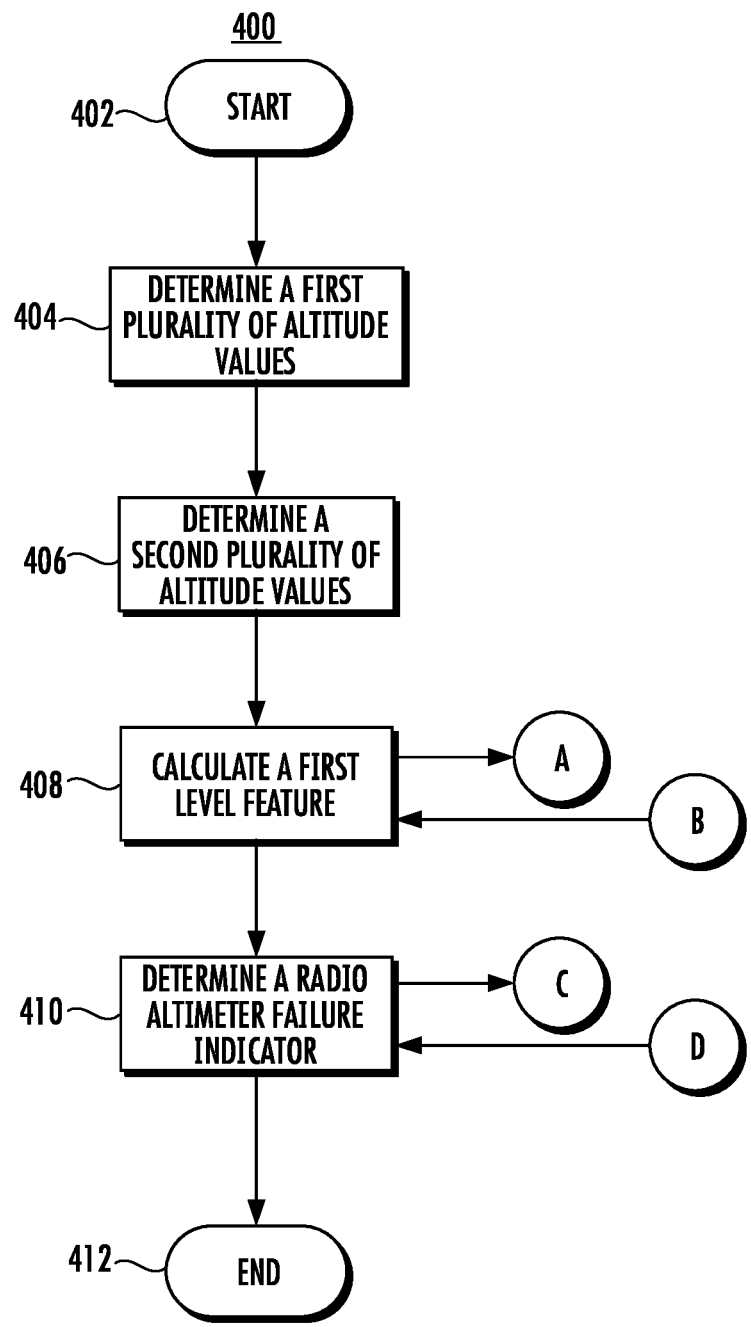
FIG. 4 illustrates an example flow diagram in accordance with various embodiments of the present disclosure.

Referring now to FIG. 4, an example method 400 in accordance with some embodiments of the present disclosure is illustrated. In particular, the example method 400 may illustrate example embodiments of generating a radio altimeter failure indicator. In some examples, the method 400 may be performed by a processing circuitry (for example, a processing circuitry of the data analytics system 115 described in connection with FIG. 1 and/or the processor 202 of the apparatus 200 described in connection with FIG. 2).

The method 400 starts at block 402.

At block 404, a processing circuitry (for example, a processing circuitry of the data analytics system 115 described in connection with FIG. 1 and/or the processor 202 of the apparatus 200 described in connection with FIG. 2) may determine a first plurality of altitude values associated with a first radio altimeter. In some examples, the processing circuitry may determine the first plurality of altitude values from a database, such as, but not limited to, the flight database 105 as shown in FIG. 1.

For example, the processing circuitry may receive a radio altimeter failure prediction request from one of the client devices 101A-101N as shown in FIG. 1. The radio altimeter failure prediction request may comprise a request to generate a radio altimeter failure indicator, which may indicate the likelihood that a radio altimeter may fail. In some examples, the radio altimeter failure prediction request may comprise an identifier associated with the radio altimeter and/or the aircraft. Upon receiving the radio altimeter failure prediction request, the processing circuitry may transmit a data retrieval request (which may comprise, for example, an identifier associated with the radio altimeter and/or the aircraft) to the flight database 105. The processing circuitry may receive flight data associated with the radio altimeter and/or the aircraft from the flight database 105. For example, the flight data may comprise a plurality of altitude values that were recorded by the radio altimeter.

In some examples, the plurality of altitude values may be associated with the aircraft in a cruising mode. As described above in connection with FIG. 3A, FIG. 3B, and/or FIG. 3C, each altitude value and/or airground value may have a corresponding time value, and each time value may be a timestamp indicating the time each altitude value and/or airground value was recorded. For example, upon receiving the radio altimeter failure prediction request, the processing circuitry may retrieve a plurality of airground values associated with the radio altimeter and/or the aircraft (from, for example, the flight database 105 as described above in connection with FIG. 1). The processing circuitry may determine a range of time values where the corresponding airground value equals to one (1). Based on the range of time values, the processing circuitry may select corresponding altitude values that are associated with the aircraft in a cruising mode, similar to those described above in connection with FIG. 3A, FIG. 3B, and/or FIG. 3C.

Additionally, or alternatively, the processing circuitry may select altitude values that associated with the aircraft not in a cruising mode (for example, in a climbing mode and/or a descending mode).

At block 406, a processing circuitry (for example, a processing circuitry of the data analytics system 115 described in connection with FIG. 1 and/or the processor 202 of the apparatus 200 described in connection with FIG. 2) may determine a second plurality of altitude values associated with a second radio altimeter.

Similar to those described above in connection with block 404, in some examples, the processing circuitry may determine the second plurality of altitude values from a database, such as, but not limited to, the flight database 105 as shown in FIG. 1. In some examples, the plurality of altitude values may be associated with the aircraft in a cruising mode as described above.

While the example as shown in FIG. 4 may illustrate two sets of altitude values, the scope of the present disclosure is not limited to only two sets. In some examples, the processing circuitry may determine additional set(s) of altitude values from one or more additional radio altimeters. In some examples, the processing circuitry may determine less than two sets of altitude values.

At block 408, a processing circuitry (for example, a processing circuitry of the data analytics system 115 described in connection with FIG. 1 and/or the processor 202 of the apparatus 200 described in connection with FIG. 2) may calculate a first level feature.

In some examples, the first level feature may be a mathematical value that may be calculated by the processing circuitry based at least in part on, for example, but not limited to, the first plurality of altitude values determined at block 404 and the second plurality of altitude values determined at block 406.

In some examples, the first level feature may comprise a plurality of altitude value differences. For example, the first level feature may comprise a plurality of mode value differences, a plurality of median value differences, a plurality of mean value differences, and/or a plurality of standard deviation value differences. Example details are described in connection with at least FIG. 5, FIG. 6, FIG. 7, and FIG. 8.

Referring back to FIG. 4, a processing circuitry (for example, a processing circuitry of the data analytics system 115 described in connection with FIG. 1 and/or the processor 202 of the apparatus 200 described in connection with FIG. 2) may determine a radio altimeter failure indicator at block 410.

In some examples, the radio altimeter failure indicator may be in the form of a flag value that may indicate whether there is or will likely be a radio altimeter failure. For example, when the radio altimeter failure indicator is set to TRUE, it may indicate that there is or will likely be a radio altimeter failure. When the radio altimeter failure indicator is set to FALSE, it may indicate that there is no radio altimeter failure (or that there is not going to be a radio altimeter failure).

In some examples, the radio altimeter failure indicator may be in the form of a percentage value, which may indicate the likelihood that the radio altimeter may fail. For example, when the radio altimeter failure indicator is set to 0%, it may indicate that the radio altimeter will not fail. In some examples, the higher the percentage value of the radio altimeter failure indicator, the more likely that the radio altimeter may fail (as predicted by the processing circuitry).

In some examples, the radio altimeter failure indicator may be in other forms.

In some examples, the processing circuitry may determine a radio altimeter failure indicator based at least in part on the first level feature. For example, the processing circuitry may calculate a second level feature based at least in part on the first level feature. Based on the second level feature, the processing circuitry may set the value of the radio altimeter failure indicator accordingly. As described above, altitude values may be recorded when the aircraft is in a cruising mode. In this example, the second level feature may indicate the trend(s) of altitude values recorded by the radio altimeter when the aircraft is cruising. Based on the trend(s), the radio altimeter failure indicator may be determined. Example details are described in connection with at least FIG. 9, FIG. 10, FIG. 11, and FIG. 12.

The method 400 ends at block 412.

Referring now to FIG. 5, FIG. 6, FIG. 7, and FIG. 8, example methods in accordance with some embodiments of the present disclosure are illustrated. In particular, these example methods may illustrate example embodiments of calculating a first level feature (which may be related to, for example, block 408 of FIG. 4 as described above).

Figure 5:
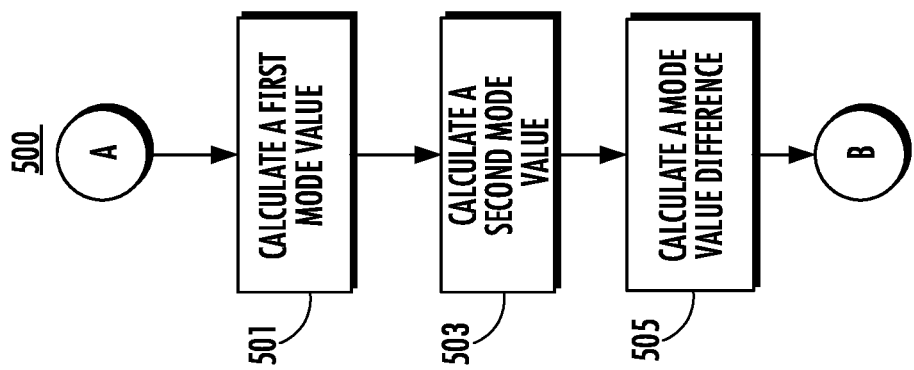
FIG. 5 illustrates an example flow diagram in accordance with various embodiments of the present disclosure.

Referring now to FIG. 5, an example method 500 in accordance with some embodiments of the present disclosure is illustrated. In particular, the example method 500 may illustrate example embodiments of calculating a mode value difference as an altitude value difference for the first level feature. In some examples, the method 500 may be performed by a processing circuitry (for example, a processing circuitry of the data analytics system 115 described in connection with FIG. 1 and/or the processor 202 of the apparatus 200 described in connection with FIG. 2).

The method 500 may start from block A. Referring back to FIG. 4, block A may be subsequent to determining a first plurality of altitude values (block 404) and determining a second plurality of altitude values (block 406).

At block 501, a processing circuitry (for example, a processing circuitry of the data analytics system 115 described in connection with FIG. 1 and/or the processor 202 of the apparatus 200 described in connection with FIG. 2) may calculate a first mode value of the first plurality of altitude values. In some examples, the first plurality of altitude values may be determined in accordance with block 404 described above in connection with FIG. 4.

The "mode value" of a data set refers to a value that appears the most often in the data set. As a non-limiting example, if the following example data set D1 represents the first plurality of altitude values:

$$D1=\{1800, 1802, 1800, 1810, 1812\}$$

The processing circuitry may determine that the first mode value is 1800, as 1800 appears the most often in the above example data set D1.

In some examples, when there are two or more modes in the first plurality of altitude values, the processing circuitry may choose the highest value among the two or more modes as the first mode value. In some examples, the processing circuitry may choose the lowest value among the two or more modes as the first mode value.

In some examples, when there is no mode from the first plurality of altitude values, the processing circuitry may calculate the median value or the mean value as the first mode value, details of which are described in connection with at least FIG. 6 and FIG. 7 herein.

At block 503, a processing circuitry (for example, a processing circuitry of the data analytics system 115 described in connection with FIG. 1 and/or the processor 202 of the apparatus 200 described in connection with FIG. 2) may calculate a second mode value of the second plurality of altitude values.

In some examples, the second plurality of altitude values may be determined in accordance with block 406 described above in connection with FIG. 4. In some examples, the second mode value may be calculated by the processing circuitry similar to those described above in connection with block 501.

At block 505, a processing circuitry (for example, a processing circuitry of the data analytics system 115 described in connection with FIG. 1 and/or the processor 202 of the apparatus 200 described in connection with FIG. 2) may calculate a mode value difference between the first mode value and the second mode value. For example, the processing circuitry may calculate the mode value difference based on the following equation:

$$\Delta Mo = Mo_1 - Mo_2$$

where $\Delta Mo$ is the mode value difference, $Mo_1$ is the first mode value calculated at block 501, and $Mo_2$ is the second mode value calculated at block 503. In some examples, the mode value difference may be an absolute value, which may be calculated based on the following equation:

$$\Delta Mo = |Mo_1 - Mo_2|$$

In some examples, the mode value difference calculated at block 505 may be one of the plurality of altitude value differences of the first level feature.

Subsequent to block 505, the method 500 may return to block B. As shown in FIG. 4, block B may be prior to determining a radio altimeter failure indicator based at least in part on the first level feature at block 410. The plurality of altitude value differences of the first level feature may comprise at least one mode value difference as described in connection with FIG. 5.

While the example as shown in FIG. 5 illustrates generating one mode value difference, it is noted that the method 500 as descried in FIG. 5 may be repeated by a processing circuitry on a plurality of first mode values and a plurality of second mode values to generate a plurality of mode value differences.

For example, the processing circuitry may generate a mode value difference for each flight. Referring to the example as shown in FIG. 3C, the processing circuitry may generate a first mode value $Mo_1^{1}$ based on the altitude values 309 and a second mode value $Mo_2^{1}$ based on the altitude values 311, and may calculate a first mode value difference $\Delta Mo^1$ based on $Mo_1^{1}$ and $Mo_2^{1}$. The processing circuitry may also generate another first mode value $Mo_1^{2}$ based on the altitude values 315 and another second mode value $Mo_2^{2}$ based on the altitude values 317, and may calculate a second mode value difference $\Delta Mo^2$ based on $Mo_1^{2}$ and $Mo_2^{2}$.

In some examples, the processing circuitry may utilize the plurality of mode value differences to determine the radio altimeter failure indicator, details of which are described in connection with at least FIG. 9, FIG. 10, FIG. 11, and FIG. 12.

Figure 6:
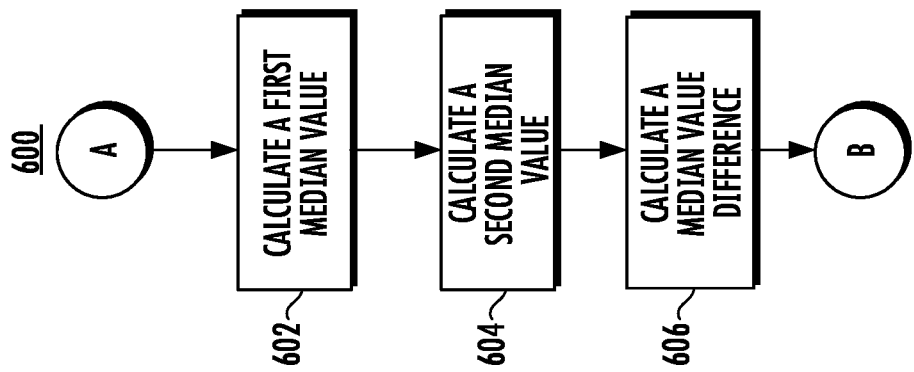
FIG. 6 illustrates an example flow diagram in accordance with various embodiments of the present disclosure.

Referring now to FIG. 6, an example method 600 in accordance with some embodiments of the present disclosure is illustrated. In particular, the example method 600 may illustrate example embodiments of calculating a median value difference as an altitude value difference for the first level feature. In some examples, the method 600 may be performed by a processing circuitry (for example, a processing circuitry of the data analytics system 115 described in connection with FIG. 1 and/or the processor 202 of the apparatus 200 described in connection with FIG. 2).

The method 600 may start from block A. Referring back to FIG. 4, block A may be subsequent to determining a first plurality of altitude values (block 404) and determining a second plurality of altitude values (block 406).

At block 602, a processing circuitry (for example, a processing circuitry of the data analytics system 115 described in connection with FIG. 1 and/or the processor 202 of the apparatus 200 described in connection with FIG. 2) may calculate a first median value of the first plurality of altitude values. In some examples, the first plurality of altitude values may be determined in accordance with block 404 described above in connection with FIG. 4.

The "median value" of a data set refers to a value in the data set that separates the higher half from the lower half. As a non-limiting example, if the following example data set D1 represents the first plurality of altitude values:

$$D1 = \{1800, 1802, 1800, 1810, 1812\}$$

The processing circuitry may determine that the first median value is 1802, as D1 contains five values and 1802 is the third value (middle) if the values are arranged from the lowest to the highest (or from the highest to the lowest).

In some examples, when there is an even number of values in the first plurality of altitude values, the processing circuitry may calculate the median value as the mean of the two middle values.

At block 604, a processing circuitry (for example, a processing circuitry of the data analytics system 115 described in connection with FIG. 1 and/or the processor 202 of the apparatus 200 described in connection with FIG. 2) may calculate a second median value of the second plurality of altitude values.

In some examples, the second plurality of altitude values may be determined in accordance with block 406 described above in connection with FIG. 4. In some examples, the second median value may be calculated by the processing circuitry similar to those described above in connection with block 602.

At block 606, a processing circuitry (for example, a processing circuitry of the data analytics system 115 described in connection with FIG. 1 and/or the processor 202 of the apparatus 200 described in connection with FIG. 2) may calculate a median value difference between the first median value and the second median value.

At block 606, a processing circuitry (for example, a processing circuitry of the data analytics system 115 described in connection with FIG. 1 and/or the processor 202 of the apparatus 200 described in connection with FIG. 2) may calculate a median value difference between the first median value and the second median value. For example, the processing circuitry may calculate the median value difference based on the following equation:

$$\Delta \tilde{x} = \tilde{x}_1 - \tilde{x}_2$$

where $\Delta \tilde{x}$ is the median value difference, $\tilde{x}_1$ is the first median value calculated at block 602, and $\tilde{x}_2$ is the second median value calculated at block 604. In some examples, the median value difference may be an absolute value, which may be calculated based on the following equation:

$$\Delta \tilde{x} = |\tilde{x}_1 - \tilde{x}_2|$$

In some examples, the median value difference calculated at block 606 may be one of the plurality of altitude value differences of the first level feature.

Subsequent to block 606, the method 600 may return to block B. Referring back to FIG. 4, block B may be prior to determining a radio altimeter failure indicator based at least in part on the first level feature at block 410. The plurality of altitude value differences of the first level feature may comprise at least one median value difference as described in connection with FIG. 6.

While the example as shown in FIG. 6 may illustrate generating one median value difference, it is noted that the method 600 as descried in FIG. 6 may be repeated by a processing circuitry on a plurality of first median values and a plurality of second median values to generate a plurality of median value differences.

For example, the processing circuitry may generate a median value difference for each flight. Referring to the example as shown in FIG. 3C, the processing circuitry may generate a first median value $\tilde{x}_1^1$ based on the altitude values 309 and a second median value $\tilde{x}_2^1$ based on the altitude values 311, and may calculate a first median value difference $\Delta \tilde{x}^1$ based on $\tilde{x}_1^1$ and $\tilde{x}_2^1$. The processing circuitry may also generate another first median value $\tilde{x}_1^2$ based on the altitude values 315 and another second median value $\tilde{x}_2^2$ based on the altitude values 317, and may calculate a second median value difference $\Delta \tilde{x}^2$ based on $\tilde{x}_1^2$ and $\tilde{x}_2^2$.

In some examples, the processing circuitry may utilize the plurality of median value differences to determine the radio altimeter failure indicator, details of which are described in connection with at least FIG. 9, FIG. 10, FIG. 11, and FIG. 12.

Figure 7:
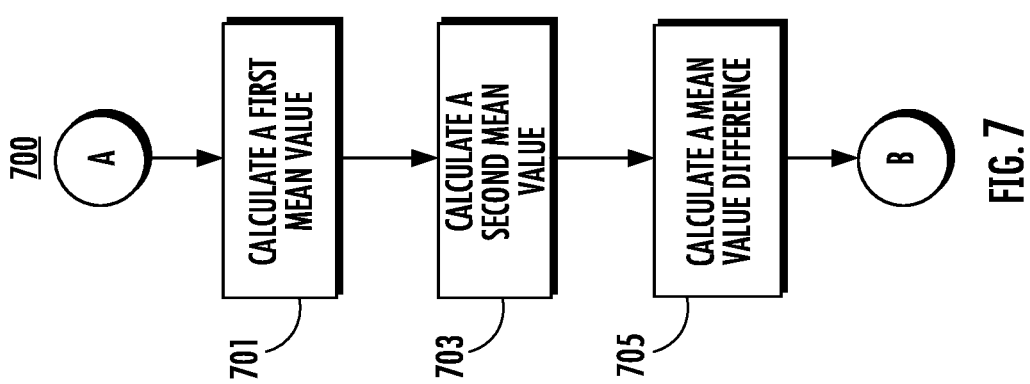
FIG. 7 illustrates an example flow diagram in accordance with various embodiments of the present disclosure.

Referring now to FIG. 7, an example method 700 in accordance with some embodiments of the present disclosure is illustrated. In particular, the example method 700 may illustrate example embodiments of calculating a mean value difference as an altitude value difference for the first level feature. In some examples, the method 700 may be performed by a processing circuitry (for example, a processing circuitry of the data analytics system 115 described in connection with FIG. 1 and/or the processor 202 of the apparatus 200 described in connection with FIG. 2).

The method 700 may start from block A. Referring back to FIG. 4, block A may be subsequent to determining a first plurality of altitude values (block 404) and determining a second plurality of altitude values (block 406).

At block 701, a processing circuitry (for example, a processing circuitry of the data analytics system 115 described in connection with FIG. 1 and/or the processor 202 of the apparatus 200 described in connection with FIG. 2) may calculate a first mean value of the first plurality of altitude values. In some examples, the first plurality of altitude values may be determined in accordance with block 404 described above in connection with FIG. 4.

The "mean value" of a data set may be calculated based on dividing the sum of values in the data set by the number of values. As a non-limiting example, if the following example data set D1 represents the first plurality of altitude values:

$$D1 = \{1800, 1802, 1800, 1810, 1812\}$$

The processing circuitry may determine that the first mean value is 1804.8, which may be calculated based on the following:

$$\frac{1800 + 1802 + 1800 + 1810 + 1812}{5} = 1804.8$$

At block 703, a processing circuitry (for example, a processing circuitry of the data analytics system 115 described in connection with FIG. 1 and/or the processor 202 of the apparatus 200 described in connection with FIG. 2) may calculate a second mean value of the second plurality of altitude values.

In some examples, the second plurality of altitude values may be determined in accordance with block 406 described above in connection with FIG. 4. In some examples, the second mean value may be calculated by the processing circuitry similar to those described above in connection with block 701.

At block 705, a processing circuitry (for example, a processing circuitry of the data analytics system 115 described in connection with FIG. 1 and/or the processor 202 of the apparatus 200 described in connection with FIG. 2) may calculate a mean value difference between the first mean value and the second mean value. For example, the processing circuitry may calculate the mean value difference based on the following equation:

$$\Delta \bar{x} = \bar{x}_1 - \bar{x}_2$$

where $\Delta \bar{x}$ is the mean value difference, $\bar{x}_1$ is the first mean value calculated at block 701, and $\bar{x}_2$ is the second mean value calculated at block 703. In some examples, the mean value difference may be an absolute value, which may be calculated based on the following equation:

$$\Delta \bar{x} = |\bar{x}_1 - \bar{x}_2|$$

In some examples, the mean value difference calculated at block 705 may be one of the plurality of altitude value differences of the first level feature.

Subsequent to block 705, the method 700 may return to block B. Referring back to FIG. 4, block B may be prior to determining a radio altimeter failure indicator based at least in part on the first level feature at block 410. The plurality of altitude value differences of the first level feature may comprise at least one mean value difference as described in connection with FIG. 7.

While the example as shown in FIG. 7 may illustrate generating one mean value difference, it is noted that the method 700 as descried in FIG. 7 may be repeated by a processing circuitry on a plurality of first mean values and a plurality of second mean values to generate a plurality of mean value differences.

For example, the processing circuitry may generate a mean value difference for each flight. Referring to the example as shown in FIG. 3C, the processing circuitry may generate a first mean value $\bar{x}_1^1$ based on the altitude values 309 and a second mean value $\bar{x}_2^1$ based on the altitude values 311, and may calculate a first mean value difference $\Delta \bar{x}^1$ based on $\bar{x}_1^1$ and $\bar{x}_2^1$. The processing circuitry may also generate another first mean value $\bar{x}_1^2$ based on the altitude values 315 and another second mean value $\bar{x}_2^2$ based on the altitude values 317, and may calculate a second mean value difference $\Delta \bar{x}^2$ based on $\bar{x}_1^2$ and $\bar{x}_2^2$.

In some examples, the processing circuitry may utilize the plurality of mean value differences to determine the radio altimeter failure indicator, details of which are described in connection with at least FIG. 9, FIG. 10, FIG. 11, and FIG. 12.

Figure 8:
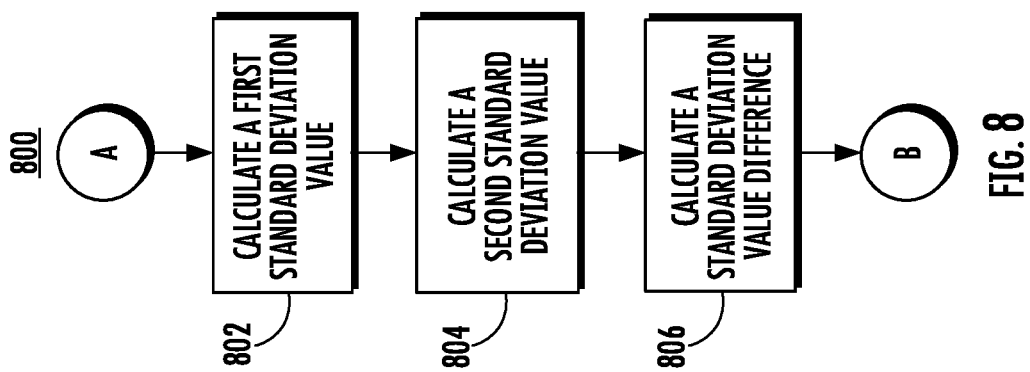
FIG. 8 illustrates an example flow diagram in accordance with various embodiments of the present disclosure.

Referring now to FIG. 8, an example method 800 in accordance with some embodiments of the present disclosure is illustrated. In particular, the example method 800 may illustrate example embodiments of calculating a standard deviation value difference as an altitude value difference for the first level feature. In some examples, the method 800 may be performed by a processing circuitry (for example, a processing circuitry of the data analytics system 115 described in connection with FIG. 1 and/or the processor 202 of the apparatus 200 described in connection with FIG. 2).

The method 800 may start from block A. Referring back to FIG. 4, block A may be subsequent to determining a first plurality of altitude values (block 404) and determining a second plurality of altitude values (block 406).

At block 802, a processing circuitry (for example, a processing circuitry of the data analytics system 115 described in connection with FIG. 1 and/or the processor 202 of the apparatus 200 described in connection with FIG. 2) may calculate a first standard deviation value of the first plurality of altitude values. In some examples, the first plurality of altitude values may be determined in accordance with block 404 described above in connection with FIG. 4.

The "standard deviation value" refers to a number that may indicate how values in a data set may spread out from the mean value. As a non-limiting example, if the following example data set D1 represents the first plurality of altitude values:

$$D1=\{1800, 1802, 1800, 1810, 1812\}$$

The processing circuitry may determine that the first standard deviation value is 5, which may be calculated based on the following:

$$(1800 - 1804.8)^2 + (1802 - 1804.8)^2 +$$
$$(1800 - 1804.8)^2 + (1810 - 1804.8)^2 + (1812 - 1804.8)^2 = 132.8$$
$$\sqrt{\frac{132.8}{5}} \approx 5$$

At block 804, a processing circuitry (for example, a processing circuitry of the data analytics system 115 described in connection with FIG. 1 and/or the processor 202 of the apparatus 200 described in connection with FIG. 2) may calculate a second standard deviation value of the second plurality of altitude values.

In some examples, the second plurality of altitude values may be determined in accordance with block 406 described above in connection with FIG. 4. In some examples, the second standard deviation value may be calculated by the processing circuitry similar to those described above in connection with block 802.

At block 806, a processing circuitry (for example, a processing circuitry of the data analytics system 115 described in connection with FIG. 1 and/or the processor 202 of the apparatus 200 described in connection with FIG. 2) may calculate a standard deviation value difference between the first standard deviation value and the second standard deviation value. For example, the processing circuitry may calculate the standard deviation value difference based on the following equation:

$$\Delta\sigma = \sigma_1 - \sigma_2$$

where $\Delta\sigma$ is the standard deviation value difference, $\sigma_1$ is the first standard deviation value calculated at block 802, and $\sigma_2$ is the second standard deviation value calculated at block 804. In some examples, the standard deviation value difference may be an absolute value, which may be calculated based on the following equation:

$$\Delta\sigma = |\sigma_1 - \sigma_2|$$

In some examples, the standard deviation value difference calculated at block 806 may be one of the plurality of altitude value differences of the first level feature.

Subsequent to block 806, the method 800 may return to block B. Referring back to FIG. 4, block B may be prior to determining a radio altimeter failure indicator based at least in part on the first level feature at block 410. The plurality of altitude value differences of the first level feature may comprise at least one standard deviation value difference as described in connection with FIG. 8.

While the example as shown in FIG. 8 may illustrate generating one standard deviation value difference, it is noted that the method 800 as descried in FIG. 8 may be repeated by a processing circuitry on a plurality of first standard deviation values and a plurality of second standard deviation values to generate a plurality of standard deviation value differences.

For example, the processing circuitry may generate a standard deviation value difference for each flight. Referring to the example as shown in FIG. 3C, the processing circuitry may generate a first standard deviation value $\sigma_1^1$ based on the altitude values 309 and a second standard deviation value $\sigma_2^1$ based on the altitude values 311, and may calculate a first standard deviation value difference $\Delta\sigma^1$ based on $\sigma_1^1$ and $\sigma_2^1$. The processing circuitry may also generate another first standard deviation value $\sigma_1^2$ based on the altitude values 315 and another second standard deviation value $\sigma_2^2$ based on the altitude values 317, and may calculate a second standard deviation value difference $\Delta\sigma^2$ based on $\sigma_1^2$ and $\sigma_2^2$.

In some examples, the processing circuitry may utilize the plurality of standard deviation value differences to determine the radio altimeter failure indicator, details of which are described in connection with at least FIG. 9, FIG. 10, FIG. 11, and FIG. 12.

While FIG. 5, FIG. 6, FIG. 7, and FIG. 8 may illustrate example methods of calculating a first level feature based at least in part on the altitude values, it is noted that the scope of the present disclosure is not limited to these examples. In some examples, the processing circuitry may calculate a maximum value, a minimum value, and/or the like as the first level feature.

Figure 9:
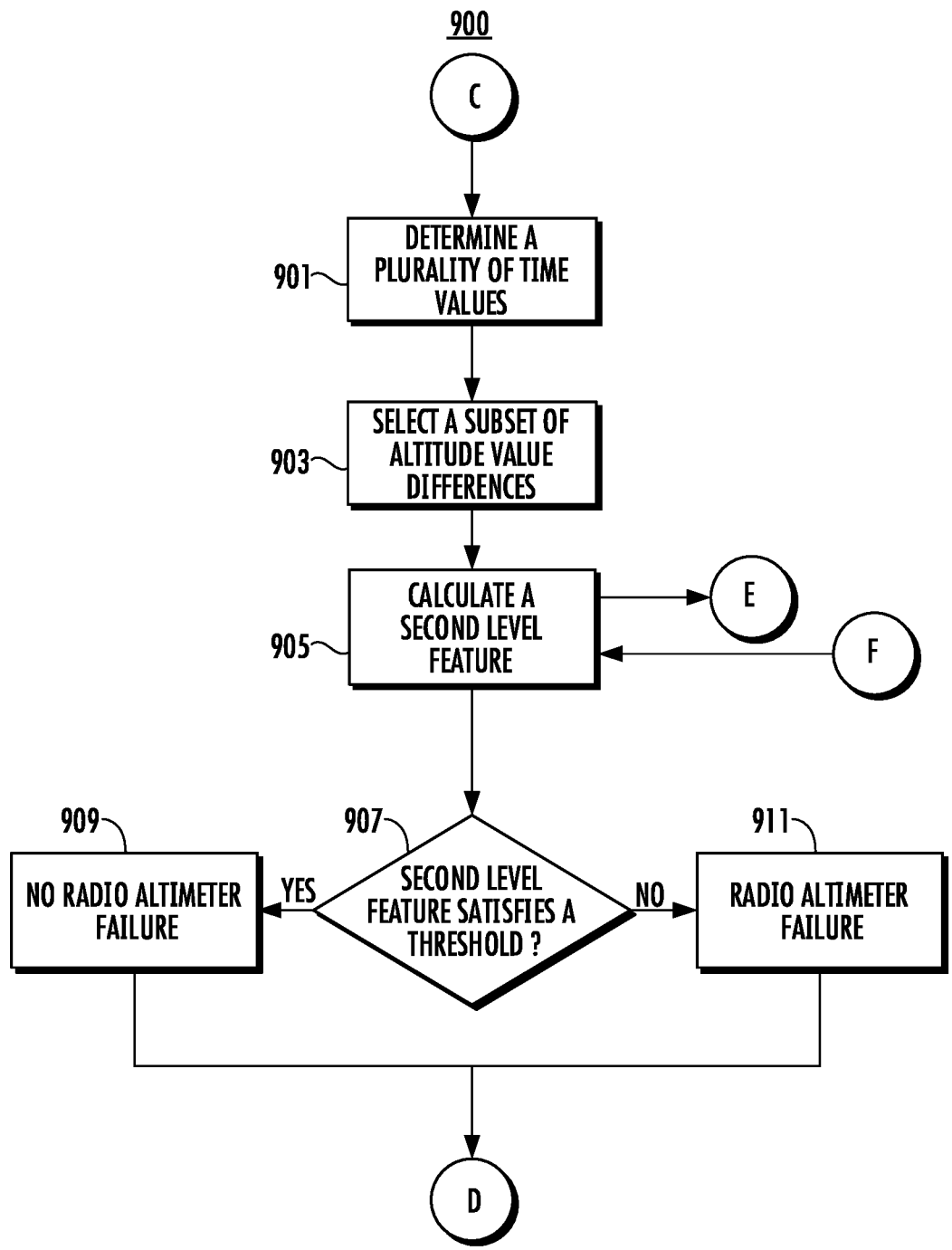
FIG. 9 illustrates an example flow diagram in accordance with various embodiments of the present disclosure.

Referring now to FIG. 9, an example method 900 in accordance with some embodiments of the present disclosure is illustrated. In particular, the example method 900 may illustrate example embodiments of calculating a second level feature for determining a radio altimeter failure indicator. In some examples, the method 900 may be performed by a processing circuitry (for example, a processing circuitry of the data analytics system 115 described in connection with FIG. 1 and/or the processor 202 of the apparatus 200 described in connection with FIG. 2).

The method 900 may start from block C. Referring back to FIG. 4, block C may be subsequent to determining a first plurality of altitude values (block 404), determining a second plurality of altitude values (block 406), and calculating a first level feature (block 408). As described above, the first level feature may comprise a plurality of altitude value differences, which may be calculated based on, but not limited to, the method 500 described above in connection with FIG. 5, the method 600 described above in connection with FIG. 6, the method 700 described above in connection with FIG. 7, and/or the method 800 described above in connection with FIG. 8.

Referring now to FIG. 9, at block 901, a processing circuitry (for example, a processing circuitry of the data analytics system 115 described in connection with FIG. 1 and/or the processor 202 of the apparatus 200 described in connection with FIG. 2) may determine a plurality of time values associated with the plurality of altitude value differences.

The plurality of altitude value differences may be, for example, a plurality of mode value differences (as described above in connection with FIG. 5), a plurality of median value differences (as described above in connection with FIG. 6), a plurality of mean value differences (as described above in connection with FIG. 7), and/or a plurality of standard deviation value differences (as described above in connection with FIG. 8).

As described above, each altitude value difference may be calculated based on the first plurality of altitude values and the second plurality of altitude values. Each altitude value may be associated with a time value that may indicate when the altitude value is recorded.

In some examples, the processing circuitry may determine the plurality of time values from a database, including, but not limited to, the flight database 105 described above in connection with FIG. 1. The processing circuitry may transmit a time value data retrieval request to the flight database 105, and may receive time values associated with the plurality of altitude value differences.

For example, in the example as shown in FIG. 3C, the processing circuitry may determine time values within the time value range 307 to be associated with the altitude value difference calculated based on the altitude values 309 and 311. As another example, the processing circuitry may determine time values within the time value range 313 to be associated with the altitude value difference calculated based on the altitude values 315 and 317.

At block 903, a processing circuitry (for example, a processing circuitry of the data analytics system 115 described in connection with FIG. 1 and/or the processor 202 of the apparatus 200 described in connection with FIG. 2) may select a subset of altitude value differences from the plurality of altitude value differences.

In some examples, the processing circuitry may select the subset of altitude value differences based on the corresponding time values. For example, the processing circuitry may select the subset of altitude value differences based on their corresponding time values satisfying a time value threshold.

Continuing from the above example associated with FIG. 3C, the processing circuitry may determine the time value threshold to be time values prior to a time point T. The time value range 307 may satisfy the time value threshold, as the time value range 307 falls prior to the time point T. Accordingly, the processing circuitry may select the altitude value difference calculated based on the altitude values 309 and 311 to be part of the subset of altitude value differences. The time value range 313 may not satisfy the time value threshold, as the time value range 313 falls subsequent to the time point T. The processing circuitry may exclude the altitude value difference calculated based on the altitude values 315 and 317 from the subset of altitude value differences.

In some examples, a time value threshold may be a time range. For example, a time value may satisfy the time value threshold if it falls within the time range of the time value threshold.

In some examples, the processing circuitry may determine the time value threshold based on one or more factors. For example, the processing circuitry may retrieve a predetermined time value threshold from a database. Additionally, or alternatively, the processing circuitry may dynamically determine the time value threshold. For example, the processing circuitry may set a time value threshold based on the model of the radio altimeter that recorded the altitude values and/or the traffic pattern associated with the aircraft. Additionally, or alternatively, the processing circuitry may determine the time value threshold based on an optimization objective value set by a user.

At block 905, a processing circuitry (for example, a processing circuitry of the data analytics system 115 described in connection with FIG. 1 and/or the processor 202 of the apparatus 200 described in connection with FIG. 2) may calculate a second level feature based at least in part on the first level feature.

In some examples, the processing circuitry may calculate a maximum difference value based on the subset of altitude value differences as the second level feature, example details of which are described in connection with at least FIG. 10. In some examples, the processing circuitry may calculate a mean value based on the subset of altitude value differences as the second level feature, example details of which are described in connection with at least FIG. 11. In some examples, the processing circuitry may calculate a standard deviation value based on the subset of altitude value differences as the second level feature, example details of which are described in connection with at least FIG. 12.

Figure 11:
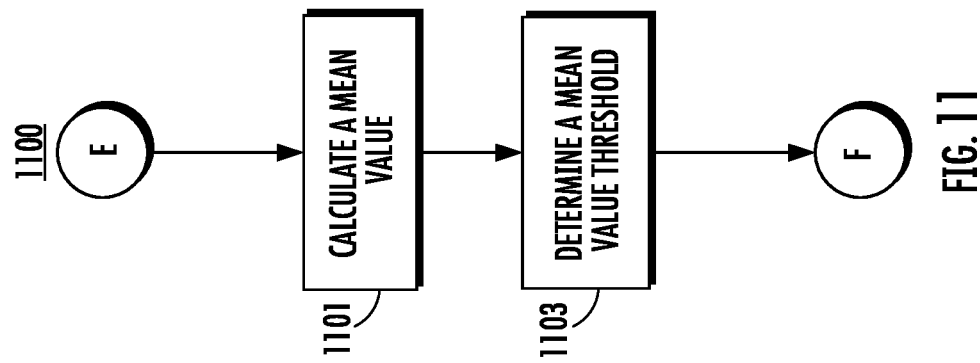
FIG. 11 illustrates an example flow diagram in accordance with various embodiments of the present disclosure.
Figure 10:
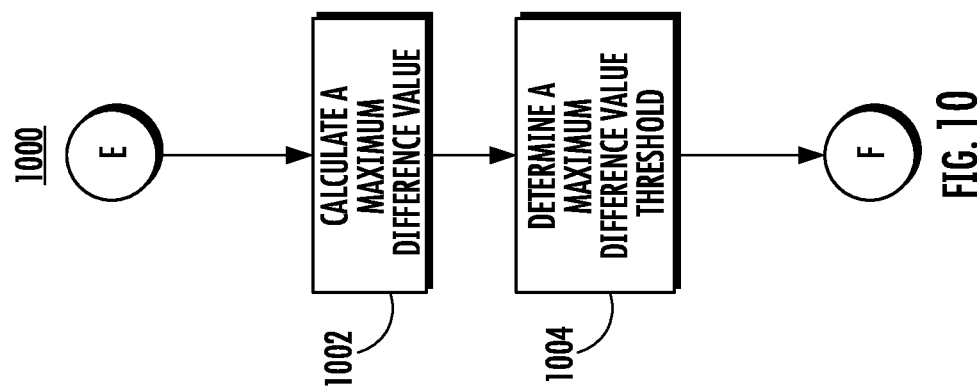
FIG. 10 illustrates an example flow diagram in accordance with various embodiments of the present disclosure.

While FIG. 10, FIG. 11, and FIG. 12 illustrates example methods of calculating a second level feature based at least in part on the first level feature, it is noted that the scope of the present disclosure is not limited to these examples. In some examples, the processing circuitry may calculate a minimum value, a mode value, a median value and/or the like as the second level feature. In some examples, the processing circuitry may select a highest value from the subset of altitude value differences as the second level feature.

Referring back to FIG. 9, a processing circuitry (for example, a processing circuitry of the data analytics system 115 described in connection with FIG. 1 and/or the processor 202 of the apparatus 200 described in connection with FIG. 2) may determine whether the second level feature satisfies a threshold at block 907.

For example, the second level feature may be a maximum difference value, and the processing circuitry may determine whether the maximum difference value satisfies a maximum difference value threshold, example details of which are described in connection with at least FIG. 10. Additionally, or alternatively, the second level feature may be a mean value, and the processing circuitry may determine whether the mean value satisfies a mean value threshold, example details of which are described in connection with at least FIG. 11. Additionally, or alternatively, the second level feature may be a standard deviation value, and the processing circuitry may determine whether the standard deviation value satisfies a standard deviation value threshold, example details of which are described in connection with at least FIG. 12.

Similar to the time value threshold described above in connection with block 903, the processing circuitry may determine the threshold value based on one or more factors. For example, the processing circuitry may determine the threshold value based on one or more machine learning models, including, but not limited to, a grid search model and/or a genetic algorithm based on the subset of the altitude value differences. Additionally, or alternatively, the processing circuitry may calculate a $F_1$ score and/or a F-beta score based on the subset of the altitude value differences, and may determine the threshold value based on the $F_1$ score and/or the F-beta score. Additionally, or alternatively, the processing circuitry may determine the threshold value based on a precision value associated with the subset of the altitude value differences. Additionally, or alternatively, the processing circuitry may determine the threshold value based on a cost matrix, which may, for example, optimize the total cost/revenue associated with the aircraft.

In some examples, the processing circuitry may generate a histogram on a user interface (via, for example but not limited to, the input/output circuitry 206 described above in connection with FIG. 2). In some examples, the histogram may show the distribution of the subset of altitude value differences. In some examples, a user may select a threshold value based on the histogram.

In some examples, the processing circuitry may additionally or alternatively implement one or more machine learning models, such as, but not limited to, random forest or logistic regression to analyze the trend of the subset of the altitude value differences. In some examples, the processing circuitry may generate a radio altimeter failure indicator based on the outputs from the machine learning model(s).

Referring back to FIG. 9, in response to determining that the second level feature satisfies the threshold, a processing circuitry (for example, a processing circuitry of the data analytics system 115 described in connection with FIG. 1 and/or the processor 202 of the apparatus 200 described in connection with FIG. 2) may cause the radio altimeter failure indicator to indicate no radio altimeter failure at block 909.

For example, if the maximum difference value is calculated to be 500, and the maximum difference value threshold is set to be as less than 800, the processing circuitry may determine that the maximum difference value satisfies the maximum difference value threshold.

In some examples, the processing circuitry may generate an electronic communication, such as, but not limited to, email, text message, application alert, and/or push notification, and may transmit it to a client device (such as, but not limited to, the client devices 101A-101N described above in connection with FIG. 1) and/or cause the client device to render the electronic communication. In some examples, the electronic communication may include the radio altimeter failure indicator.

As described above, the radio altimeter failure indicator may be in various forms. For example, the radio altimeter failure indicator may be in the form of a flag value, which may indicate whether there is or will likely be a radio altimeter failure. In this example, the radio altimeter failure indicator may be FALSE, and the corresponding electronic communication may indicate that there is no radio altimeter failure. In some examples, upon receiving the electronic communication via a client device, a user (for example, the aircraft maintenance team) may not take any further action.

As another example, the radio altimeter failure indicator may be in the form of a percentage value, which may indicate the likelihood that the radio altimeter may fail. For example, in response to determining that the second level feature satisfies the threshold, the processing circuitry may set the radio altimeter failure indicator to 0%, and may generate an electronic communication accordingly, similar to those described above.

Referring back to FIG. 9, in response to determining that the second level feature does not satisfy the threshold, a processing circuitry (for example, a processing circuitry of the data analytics system 115 described in connection with FIG. 1 and/or the processor 202 of the apparatus 200 described in connection with FIG. 2) may cause the radio altimeter failure indicator to indicate a radio altimeter failure at block 911.

For example, if the maximum difference value is calculated to be 500, and the maximum difference value threshold is set to be less than 300, the processing circuitry may determine that the maximum difference value does not satisfy the maximum difference value threshold.

In some examples, the processing circuitry may generate an electronic communication that may include the radio altimeter failure indicator, similar to those described above. In some examples, the radio altimeter failure indicator may be in the form of a flag value (TRUE) that may indicate there is likely a radio altimeter failure.

In some examples, the radio altimeter failure indicator may be in the form of a percentage value. The processing circuitry may calculate the percentage value based on the value of the second level feature and/or the threshold. For example, the processing circuitry may subtract the value of the second level feature from the threshold value, and may divide the resultant subtraction by the threshold value. Continuing from the above example, the processing circuitry may calculate the radio altimeter failure indicator as follows:

$$\frac{(500-300)}{300} \approx 66\%$$

In this example, the electronic communication may indicate that there may be 66% likelihood that the radio altimeter may fail. Additionally, or alternatively, other methods may be implemented to calculate the radio altimeter failure indicator.

In some examples, upon receiving the electronic communication via a client device, a user (for example, the aircraft maintenance team) may proceed with performing maintenance operations, such as, but not limited to, replacing the radio altimeter.

As illustrated above, the radio altimeter failure indicator may provide valuable insight on the performance of radio altimeter, and may predict failure before it takes place.

Subsequent to block 909 and block 911, the method 900 may return to block D. As shown in FIG. 4, block D may be prior to the method 400 ends at block 412.

Referring now to FIG. 10, FIG. 11, and FIG. 12, example methods in accordance with some embodiments of the present disclosure are illustrated. In particular, these example methods may illustrate example embodiments of calculating the second level feature.

Referring now to FIG. 10, an example method 1000 in accordance with some embodiments of the present disclosure is illustrated. In particular, the example method 1000 may illustrate example embodiments of calculating a maximum difference value as the second level feature. In some examples, the method 1000 may be performed by a processing circuitry (for example, a processing circuitry of the data analytics system 115 described in connection with FIG. 1 and/or the processor 202 of the apparatus 200 described in connection with FIG. 2).

The method 1000 may start from block E. Referring back to FIG. 9, block E may be subsequent to selecting a subset of altitude value differences (block 903) and prior to determining whether the second level feature satisfies a threshold (block 907).

At block 1002, a processing circuitry (for example, a processing circuitry of the data analytics system 115 described in connection with FIG. 1 and/or the processor 202 of the apparatus 200 described in connection with FIG. 2) may calculate a maximum difference value.

In some examples, the maximum difference value calculated at block 1002 may be based on the subset of the altitude value differences determined at block 903 of FIG. 9. The "maximum difference" of a data set may be calculated by subtracting the lowest value from the highest value in the data set. As a non-limiting example, if the following example data set D1 represents the subset of altitude value differences:

$$D1=\{50,65,44,11,85\}$$

The processing circuitry may determine that the maximum difference value is 74, which may be calculated based on the following:

$$85-11=74$$

In some examples, the processing circuitry may set the value of the second level feature to be the maximum difference value as calculated at block 1002, which in turn may be used at block 907 of FIG. 9.

Referring back to FIG. 10, a processing circuitry (for example, a processing circuitry of the data analytics system 115 described in connection with FIG. 1 and/or the processor 202 of the apparatus 200 described in connection with FIG. 2) may determine a maximum difference value threshold at block 1004.

In some examples, the processing circuitry may determine the maximum difference value threshold in accordance with methods described above in connection with FIG. 9. In some examples, the processing circuitry may set the value of the maximum difference value threshold as the threshold in block 907 of FIG. 9.

Subsequent to block 1004, the method 1000 may return to block F. As shown in FIG. 9, block F may be prior to determining whether the second level feature satisfies a threshold at block 907. In some examples, the processing circuitry may use the maximum difference value calculated at block 1002 and the maximum difference value threshold calculated at block 1004 for the determination at block 907.

Referring now to FIG. 11, an example method 1100 in accordance with some embodiments of the present disclosure is illustrated. In particular, the example method 1100 may illustrate example embodiments of calculating a mean value as the second level feature. In some examples, the method 1100 may be performed by a processing circuitry (for example, a processing circuitry of the data analytics system 115 described in connection with FIG. 1 and/or the processor 202 of the apparatus 200 described in connection with FIG. 2).

The method 1100 may start from block E. Referring back to FIG. 9, block E may be subsequent to selecting a subset of altitude value differences (block 903) and prior to determining whether the second level feature satisfies a threshold (block 907).

At block 1101, a processing circuitry (for example, a processing circuitry of the data analytics system 115 described in connection with FIG. 1 and/or the processor 202 of the apparatus 200 described in connection with FIG. 2) may calculate a mean value.

In some examples, the mean value calculated at block 1101 may be based on the subset of the altitude value differences determined at block 903 of FIG. 9. In some examples, the calculation of the mean value may be similar to those described above in connection with FIG. 7.

Referring back to FIG. 11, a processing circuitry (for example, a processing circuitry of the data analytics system 115 described in connection with FIG. 1 and/or the processor 202 of the apparatus 200 described in connection with FIG. 2) may determine a mean value threshold at block 1103.

In some examples, the processing circuitry may determine the mean value threshold in accordance with the methods described above in connection with FIG. 9. In some examples, the processing circuitry may set the mean value threshold as the threshold in block 907 of FIG. 9.

Subsequent to block 1103, the method 1100 may return to block F. As shown in FIG. 9, block F may be prior to determining whether the second level feature satisfies a threshold at block 907. In some examples, the processing circuitry may use the mean value calculated at block 1101 and the mean value threshold calculated at block 1103 for the determination at block 907.

Referring now to FIG. 12, an example method 1200 in accordance with some embodiments of the present disclosure is illustrated. In particular, the example method 1200 may illustrate example embodiments of calculating a standard deviation value as the second level feature. In some examples, the method 1200 may be performed by a processing circuitry (for example, a processing circuitry of the data analytics system 115 described in connection with FIG. 1 and/or the processor 202 of the apparatus 200 described in connection with FIG. 2).

The method 1200 may start from block E. Referring back to FIG. 9, block E may be subsequent to selecting a subset of altitude value differences (block 903) and prior to determining whether the second level feature satisfies a threshold (block 907).

At block 1202, a processing circuitry (for example, a processing circuitry of the data analytics system 115 described in connection with FIG. 1 and/or the processor 202 of the apparatus 200 described in connection with FIG. 2) may calculate a standard deviation value.

In some examples, the standard deviation value calculated at block 1202 may be based on the subset of the altitude value differences determined at block 903 of FIG. 9 by the processing circuitry. In some examples, the calculation of the standard deviation value may be similar to those described above in connection with FIG. 8.

At block 1204, a processing circuitry (for example, a processing circuitry of the data analytics system 115 described in connection with FIG. 1 and/or the processor 202 of the apparatus 200 described in connection with FIG. 2) may determine a standard deviation value threshold.

In some examples, the processing circuitry may determine the standard deviation value threshold in accordance with the methods described above in connection with FIG. 9. In some examples, the processing circuitry may set the standard deviation value threshold as the threshold in block 907 of FIG. 9.

Subsequent to block 1204, the method 1200 may return to block F. As shown in FIG. 9, block F may be prior to determining whether the second level feature satisfies a threshold at block 907. In some examples, the processing circuitry may use the standard deviation value calculated at block 1202 and the standard deviation value threshold calculated at block 1204 for the determination at block 907.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, wherein the at least one non-transitory memory and the program code are configured to, with the at least one processor, cause the apparatus to at least:
calculate a first level feature based at least in part on a first plurality of altitude values associated with a first radio altimeter and a second plurality of altitude values associated with a second radio altimeter, wherein the first level feature comprises a plurality of altitude value differences; and
determine a radio altimeter failure indicator based at least in part on the first level feature.

2. The apparatus of claim 1, wherein the first radio altimeter and the second radio altimeter are associated with an aircraft, wherein the first plurality of altitude values and the second plurality of altitude values are associated with the aircraft in a particular mode selected from the group of a takeoff mode, a climbing mode, a cruising mode, a descending mode, and a landing mode.

3. The apparatus of claim 1, wherein, when determining the radio altimeter failure indicator, the at least one non-transitory memory and the program code are configured to, with the at least one processor, cause the apparatus to further calculate a second level feature based at least in part on the first level feature.

4. The apparatus of claim 3, wherein, when calculating the second level feature, the at least one non-transitory memory and the program code are configured to, with the at least one processor, cause the apparatus to further:
determine a plurality of time values associated with the plurality of altitude value differences; and
select a subset of altitude value differences from the plurality of altitude value differences, wherein corresponding time values associated with the subset of altitude value differences satisfy a time value threshold.

5. A computer-implemented method, comprising:
calculating a first level feature based at least in part on a first plurality of altitude values associated with a first radio altimeter and a second plurality of altitude values associated with a second radio altimeter, wherein the first level feature comprises a plurality of altitude value differences; and
determining a radio altimeter failure indicator based at least in part on the first level feature.

6. The computer-implemented method of claim 5, wherein the first radio altimeter and the second radio altimeter are associated with an aircraft, wherein the first plurality of altitude values and the second plurality of altitude values are associated with the aircraft in a particular mode selected from the group of a takeoff mode, a climbing mode, a cruising mode, a descending mode, and a landing mode.

7. The computer-implemented method of claim 5, wherein determining the radio altimeter failure indicator further comprises calculating a second level feature based at least in part on the first level feature.

8. The computer-implemented method of claim 7, wherein calculating the second level feature further comprises:
determining a plurality of time values associated with the plurality of altitude value differences; and
selecting a subset of altitude value differences from the plurality of altitude value differences, wherein corresponding time values associated with the subset of altitude value differences satisfy a time value threshold.

9. A computer program product comprising at least one non-transitory computer-readable storage medium having computer-readable program code portions stored therein, the computer-readable program code portions comprising an executable portion configured to:
calculate a first level feature based at least in part on a first plurality of altitude values associated with a first radio altimeter and a second plurality of altitude values associated with a second radio altimeter, wherein the first level feature comprises a plurality of altitude value differences; and
determine a radio altimeter failure indicator based at least in part on the first level feature.

10. The computer program product of claim 9, wherein the first radio altimeter and the second radio altimeter are associated with an aircraft, wherein the first plurality of altitude values and the second plurality of altitude values are associated with the aircraft in a particular mode selected from the group of a takeoff mode, a climbing mode, a cruising mode, a descending mode, and a landing mode.

11. The computer program product of claim 9, wherein, when determining the radio altimeter failure indicator, the executable portion is configured to calculate a second level feature based at least in part on the first level feature.

12. The computer program product of claim 11, wherein, when calculating the second level feature, the executable portion is configured to:
determine a plurality of time values associated with the plurality of altitude value differences; and
select a subset of altitude value differences from the plurality of altitude value differences, wherein corresponding time values associated with the subset of altitude value differences satisfy a time value threshold.

13. The apparatus of claim 1, wherein each altitude value difference of the plurality of altitude value differences comprises a median value difference, a mode value difference, a mean value difference, or a standard deviation difference.

14. The apparatus of claim 4, wherein the at least one non-transitory memory and the program code are configured to, with the at least one processor, cause the apparatus to further:
determine the time value threshold based at least in part on a machine learning model, a cost matrix, or a histogram.

15. The apparatus of claim 1, wherein the radio altimeter failure indicator comprises a percentage value indicating a likelihood that the first radio altimeter or the second radio altimeter will fail.

16. The computer-implemented method of claim 5, wherein each altitude value difference of the plurality of altitude value differences comprises a median value difference, a mode value difference, a mean value difference, or a standard deviation difference.

17. The computer-implemented method of claim 8, further comprising:
determining the time value threshold based at least in part on a machine learning model, a cost matrix, or a histogram.

18. The computer-implemented method of claim 5, wherein the radio altimeter failure indicator comprises a percentage vale indicating a likelihood that the first radio altimeter or the second radio altimeter will fail.

19. The computer program product of claim 9, wherein each altitude value difference of the plurality of altitude value differences comprises a median value difference, a mode value difference, a mean value difference, or a standard deviation difference.

20. The computer program product of claim 12, wherein the executable portion is configured to:
   determine the time value threshold based at least in part on a machine learning model, a cost matrix, or a histogram.

* * * * *